US008671071B1

(12) United States Patent
Brinson, Jr. et al.

(10) Patent No.: US 8,671,071 B1
(45) Date of Patent: Mar. 11, 2014

(54) DATA PROCESSING SYSTEM AND METHOD USING RELATIONAL SIGNATURES

(75) Inventors: Robert Maddox Brinson, Jr., Rome, GA (US); Nicholas Levi Middleton, Highlands Ranch, CO (US); Robert Wayne White, Englewood, CO (US)

(73) Assignee: Apokalyyis, Inc., Denver, CO (US)

( * ) Notice: Subject to any disclaimer, the term of this patent is extended or adjusted under 35 U.S.C. 154(b) by 213 days.

(21) Appl. No.: 13/187,888

(22) Filed: Jul. 21, 2011

Related U.S. Application Data

(60) Provisional application No. 61/367,386, filed on Jul. 24, 2010, provisional application No. 61/367,387, filed on Jul. 24, 2010, provisional application No. 61/367,389, filed on Jul. 24, 2010, provisional application No. 61/367,393, filed on Jul. 24, 2010, provisional application No. 61/367,392, filed on Jul. 24, 2010, provisional application No. 61/367,391, filed on Jul. 24, 2010.

(51) Int. Cl.
*G06F 7/00* (2006.01)

(52) U.S. Cl.
USPC .......................................... 707/602

(58) Field of Classification Search
USPC ................. 707/602, 722, 732, 733, 737, 802; 715/212, 752
See application file for complete search history.

(56) References Cited

U.S. PATENT DOCUMENTS

| | | | |
|---|---|---|---|
| 4,393,269 A * | 7/1983 | Konheim et al. ............... 705/75 |
| 5,559,895 A * | 9/1996 | Lee et al. ..................... 382/119 |
| 7,492,938 B2 | 2/2009 | Brinson, Jr. et al. |
| 7,606,779 B2 | 10/2009 | Brinson, Jr. et al. |
| 8,046,798 B1 * | 10/2011 | Schlack et al. .................. 725/46 |
| 8,166,159 B2 * | 4/2012 | Kalasapur et al. ............ 709/224 |
| 8,239,750 B2 * | 8/2012 | Thomsen ...................... 715/212 |
| 2002/0065912 A1 * | 5/2002 | Catchpole et al. ............ 709/224 |
| 2004/0049411 A1 * | 3/2004 | Suchard et al. .................... 705/4 |
| 2004/0215430 A1 * | 10/2004 | Huddleston et al. ............. 703/2 |
| 2005/0010758 A1 * | 1/2005 | Landrock et al. ............. 713/156 |
| 2007/0226504 A1 * | 9/2007 | de la Iglesia et al. ......... 713/176 |
| 2009/0222387 A1 * | 9/2009 | Gehrmann et al. ............. 706/12 |
| 2009/0240741 A1 | 9/2009 | Middleton et al. |
| 2010/0017353 A1 | 1/2010 | Brinson, Jr. et al. |
| 2010/0165943 A1 * | 7/2010 | Kato et al. .................... 370/329 |
| 2011/0087969 A1 * | 4/2011 | Hein et al. .................... 715/752 |

* cited by examiner

*Primary Examiner* — Hung T Vy
(74) *Attorney, Agent, or Firm* — Marsh Fischmann & Breyfogle LLP

(57) ABSTRACT

Configurations and applications for data signatures are disclosed. Such a data signature may be specific to a particular data element in a data set, and may define this particular data element in relation to one or more other data elements. These data signatures may be used for any appropriate purpose. For instance, data signatures of this type may be generated from a given data set and may be used to analyze this data set in at least some respect, including to identify one or more features in the data set (e.g., for feature extraction purposes). Data signatures of this type may also be used in at least some fashion to generate a presentation or output that relates to the associated data set (including digitally on an appropriate display, as well as in "hard copy" form).

99 Claims, 27 Drawing Sheets

| Label 270 | | |
|---|---|---|
| Signature $190_1$ | Metadata $109_1$ | Feature ID $272_1$ |
| Signature $190_2$ | Metadata $109_2$ | Feature ID $272_2$ |
| Signature $190_n$ | Metadata $109_n$ | Feature ID $272_n$ |

FIG. 11

DATA PROCESSING SYSTEM AND METHOD USING RELATIONAL SIGNATURES

CROSS-REFERENCE TO RELATED APPLICATIONS

This patent application is a non-provisional patent application of, and claims priority to, each of the following provisional patent applications: 1) U.S. Provisional Patent Application Ser. No. 61/367,386, that is entitled "DATA PROCESSING SYSTEM & METHOD USING RELATIONAL SIGNATURES," and that was filed on Jul. 24, 2010; 2) U.S. Provisional Patent Application Ser. No. 61/367,387, that is entitled "RELATIONAL DATA SIGNATURES," and that was filed on Jul. 24, 2010; 3) U.S. Provisional Patent Application Ser. No. 61/367,389, that is entitled "SIGNATURE PLOT-BASED DATA PRESENTATION SYSTEM & METHOD," and that was filed on Jul. 24, 2010; 4) U.S. Provisional Patent Application Ser. No. 61/367,393, that is entitled "NON-IMAGERY DATA PRESENTATION SYSTEM & METHOD," and that was filed on Jul. 24, 2010; 5) U.S. Provisional Patent Application Ser. No. 61/367,392, that is entitled "SIGNATURE-BASED DATA PRESENTATION SYSTEM & METHOD," and that was filed on Jul. 24, 2010; and 6) U.S. Provisional Patent Application Ser. No. 61/367,391, that is entitled "SIGNATURE VALUE-BASED DATA PRESENTATION SYSTEM & METHOD," and that was filed on Jul. 24, 2010. The entire disclosure of each of the six above-noted provisional patent applications is hereby incorporated by reference in their entirety herein.

FIELD OF THE INVENTION

Various aspects of the present invention generally relate to what may be broadly characterized as data handling operations (e.g., assessment of data; presentation of data) and, more particularly, using relational signatures to facilitate one or more aspects of data handling operations.

BACKGROUND

The volume of data that is being generated has experienced rather significant growth in recent times. Analyzing large quantities of data may require a significant amount of time (whether done manually or by one or more computers), which may be undesirable and/or unacceptable in at least some circumstances. Adding to the complexity of data analysis is that data may be of any number of data types. "Automated" data analyzers (e.g., pattern recognition algorithms; feature extractors) may be expensive to develop, and furthermore may be specific to only a single data type or a particular data application.

SUMMARY

A first aspect of the present invention is embodied by a data processing system. Components of this data processing system include a user interface, a data extractor, a signature processing engine, and a knowledge base data store. The data extractor includes both a data extraction layer and an iterator, where the iterator is operatively connected with the data extraction layer (e.g., in communication with the data extraction layer). The signature processing engine is operatively connected with the data extractor, while the knowledge base data store is operatively connected with the signature processing engine.

A second aspect of the present invention is embodied by a data processing system. Components of this data processing system include a user interface, a data extractor, a signature processing engine, an algorithm store, a signature profile, and a knowledge base data store. The signature processing engine is operatively connected with the data extractor. Both the algorithm store and knowledge base data store are operatively connected with the signature processing engine, and where the algorithm store includes a plurality of algorithms. The signature profile is used by the signature processing engine and is configurable by communication between the user interface and the algorithm store.

A third aspect of the present invention is embodied by a data processing system. Components of this data processing system include a user interface, a data extractor, a signature processing engine, a signature profile, and a knowledge base data store. The signature processing engine is operatively connected with both the data extractor and the knowledge base data store. The signature profile is used by the signature processing engine and is independent of the data type that is input to the data extractor (e.g. the data processing system may be characterized as being data agnostic).

A number of feature refinements and additional features are separately applicable to each of above-noted first, second, and third aspects of the present invention. These feature refinements and additional features may be used individually or in any combination in relation to each of the first, second, and third aspects. A data set may be provided to the data extractor, which may open the data set in any appropriate manner. This data set may be of any appropriate data type, of any appropriate dimension (e.g., n-dimensional data; three-dimensional data; two-dimensional data; one-dimensional data; zero-dimensional data), or both (e.g., in the case of imagery as the data type, representative dimensions include without limitation two, three, and n-dimensions). A data set of a given data type may also be of any appropriate modality (e.g., in the case of imaging as the data type, representative modalities include without limitation photographic, hyperspectral, InSAR, x-ray, CT, PET, etc).

One option is for the data set to include raw data. The data set may actually be in the form of multiple data sets (e.g., multiple data streams). Consider the case where the data set includes first and second data sets. The first and second data sets may include data of a common data type. Alternatively, the first and second data sets may include data of a different data type.

Another option is for the data set to include what may be characterized as processed data. For instance, the data set may include one or more signatures that will be discussed in more detail below (e.g., generated from the signature processing engine of the data processing system; generated by at least one other signature processing engine). One type of signature may be characterized as defining a particular data element in relation to one or more other data elements (e.g., generated directly from raw data; a single or one-dimensional signature). Multiple signatures in a data set may include a first subset of signatures that are generated from a first raw data set, along with a second subset of signatures that are generated from a second raw data set. Higher order and/or derivative signatures may be in a data set as well (e.g., n-dimensional signatures). In any case, one or more signatures may be provided to the data extractor from the signature processing engine, from at least one other signature processing engine of the same data processing system, from at least one other signature processing engine from another data processing system, from at least one knowledge base data store, from at least one signature store, or any combination thereof.

The data extractor may be characterized as providing an interface between a data set and the signature processing engine. One representative configuration for the data extractor is a data extraction layer and a separate iterator that may be operatively connected with the data extraction layer (e.g., such that there is at least one-way communication between the data extraction layer and the iterator). In one embodiment, the data extraction layer is implemented by appropriately programmed software. One or more processors can also be utilized by the data extraction layer. The data extraction layer may also utilize both software and at least one processor.

One function that may be provided by the data extractor/data extraction layer is to extract data from the data set (e.g., the data extractor may be configured to extract data from the data set for use by the signature processing engine). The data extractor/data extraction layer may be configured to extract both actual or raw data and metadata from the data set. The data extractor/data extraction layer may be configured to organize and/or format data from a data set for the iterator. A data set may be opened by the data extractor/data extraction layer, and data extracted from the data set by the data extractor/data extraction layer may be transmitted to or otherwise may be made available to the iterator.

The data extraction layer may be configured to create the iterator. In one embodiment, the iterator is created from input provided to the data extraction layer by the signature processing engine. A communication link of any appropriate type may be provided between the signature processing engine and the data extractor. Such a communication link may allow the signature processing engine to communicate one or more requirements to the data extractor/data extraction layer (e.g., prior to generating any signatures from the data set).

A signature profile communication may be transmitted from the signature processing engine to the data extractor/data extraction layer. Such a signature profile communication may convey information on each algorithm that is to be used by the signature processing engine to generate one or more signatures from the data set. An algorithm set in the form of one or more algorithms, arranged in a certain order, may define a signature profile and as will be discussed in more detail below.

The signature processing engine may be configured to output data configuration information to the data extractor/data extraction layer. For instance, the signature processing information engine may communicate the format in which the data from the data set should be presented to the signature processing engine to generate signatures therefrom. The manner in which data that is provided to the signature processing engine to generate signatures therefrom may be characterized as being controlled or otherwise established by the signature processing engine (e.g., by a communication or output from the signature processing engine to the data extractor/data extraction layer).

The iterator may be configured to sequence through the data (e.g., formatted by the data extraction layer) and provide the same to the signature processing engine. The data extraction layer may format the data in a manner that simplifies the iteration logic. In any case, the iterator may be driven by the data extraction layer and/or the signature processing engine. That is, the iterator may retrieve the actual data and associated metadata from each position.

The entire data set may be processed by the iterator for use by the signature processing engine. Data of a predetermined format may be passed or otherwise transmitted by the iterator to the signature processing engine. This predetermined format may be established by the signature processing engine (e.g., based upon the signature profile or algorithm set to be utilized to generate signatures from the data set, and which may be based at least in part upon user input provided through the user interface). Actual or raw data, metadata, or both may be provided to the signature processing engine by the iterator.

The signature processing engine may generate a plurality of signatures from a given data set. Signatures that are generated by the signature processing engine from a data set may be referred to herein as "processed signatures" when these signatures are to be compared with other signatures (e.g., data store signatures discussed below). For instance, each of the processed signatures may be compared with the knowledge base data store. In this regard, the knowledge base data store may include a plurality of signatures, and these particular signatures may be characterized as "data store signatures."

Each of the signatures generated by the signature processing engine from a given data set may be defined by a common signature profile. This same common signature profile may have been previously used to generate a plurality of signatures that are stored in the knowledge base data store in the form of data store signatures (e.g., to utilize a common format for signatures that are generated by the signature processing engine for purposes of comparing the same with signatures within the knowledge base data store). In this regard, the signature profile may be used to make a selection of a particular knowledge base data store (having signatures defined by the same signature profile) from a plurality of knowledge base data stores (e.g., knowledge base data stores may utilize different signature profiles). The data processing system may include any appropriate comparator for purposes of assessing signatures being generated by the signature processing engine from a given data set in relation to the knowledge base data store (e.g., to determine if a particular signature generated from a data set is a "match" with any signature within the knowledge base data store).

The noted signature profile may be characterized as an algorithm set. Whether characterized as a signature profile or algorithm set, the same may include and/or may be defined by at least one algorithm. If the signature profile/algorithm set includes multiple algorithms, they may be arranged in a certain order. Various different signature profiles/algorithm sets may utilize the same set of algorithms, but with the algorithms being arranged in different orders. Although reordering the same algorithms may in fact generate different signatures, this may not substantially impact the subsequent effectiveness of the signatures (e.g., for feature extraction; for visualization).

The signature processing engine may be configured to process data from a data set on a data element-by-data element basis. A signature may be specific to a particular data element, and may define this data element in relation to one or more other data elements (e.g., from the same data set). The data element for which a signature is being generated may be referred to as a focal data element. The data element for which a signature has all been generated may be referred to as a focal data element as well. Each data element that is used to define a focal data element may be referred to as a related data element, a surrounding data element, or the like. Any number of data elements may be utilized to relationally define a particular focal data element by its signature. Multiple data elements that are used to relationally define a particular focal data element by its signature may be disposed in any appropriate pattern or arrangement. The pattern or arrangement of data elements that are used to relationally define a focal data element may be characterized as being part of the signature profile.

The data processing system may include an algorithm store. This algorithm store may be characterized as being operatively connected with the signature processing engine (e.g., to allow at least one way communication between the algorithm store and signature processing engine). The algorithm store may include a plurality of algorithms. A signature profile that is to be used by the signature processing engine to generate signatures from a given data set may be configured by communication between the user interface and the algorithm store. For instance, user input could be provided to display a listing of algorithms within the algorithm store (e.g., via a drop-down menu). Search functionality could also be utilized to select one or more algorithms from the algorithm store for a particular signature profile. One or more algorithms for a particular signature profile could also be input through the user interface. Generally, a signature profile may include one or more algorithms retrieved in any appropriate manner from the algorithm store, one or more algorithms input to the data processing system through the user interface, or a combination thereof.

The knowledge base data store again may incorporate a plurality of previously generated signatures. The knowledge base data store may have one or more signature collections. A given collection of signatures within the data store may be derived from a number of different sources, such as raw data or other than from raw data. Higher order signatures may also define a signature collection for the data store. A data store may have a single collection of signatures. The data processing system could also utilize one or more data stores, each having at least one signature collection.

Each signature collection may include multiple signatures that are generated from a common signature profile or algorithm set. This common signature profile again may be defined by one or more algorithms. Each algorithm may provide one or more values for a signature that is generated using the corresponding signature profile. If a given signature profile uses multiple algorithms, a signature generated therefrom should have multiple values. A signature may then be characterized as a collection of one or more values.

Further characterizations may be made in relation to the knowledge base data store and its signatures. Each signature and the knowledge base data store may be associated with at least one label. As will be discussed in more detail below, the knowledge base data store may include at least one binary tree. Each node of such a binary tree, or more generally each node in the knowledge base data store, may include a label. This label may be associated with one or more signatures. If a processed signature "matches" a particular node in the knowledge base data store, the label may be used to retrieve/identify all related signatures, associated metadata, and associated features. How a particular signature from a label having multiple signatures may be selected in relation to a processed signature will be discussed in more detail below.

A feature may be associated with each signature that is part of the knowledge base data store. Features may be associated with signatures within the knowledge base data store in any appropriate manner. Identifying a "match" between a signature generated by the signature processing engine from a particular data set, and a signature within the knowledge base data store, may be used by the data processing system for any appropriate purpose, for instance to identify the existence of a feature in the particular data set, to render a new layer of data, to output a presentation of the data set (e.g., on a display, on a printout), or the like.

Metadata may be associated with each signature that is part of the knowledge base data store. Any appropriate type of metadata may be associated with each signature. Representative metadata includes without limitation an identification of the signature profile, the algorithm(s) used to generate the signature, information on the device that generated the data set from which the signature was generated, information on the sensor(s) that was used to acquire the data set, the "location" of the data element within the data set for which the signature was generated (e.g., pixel location), machine data, sensor data, last maintenance data point location, capture date, capture time, and the like.

Each signature again may be representative of a single data element and its relationship with one or more other data elements (e.g., from the same data set). The data element defined by a corresponding signature may include a single data point, or may include multiple data points. In any case, each signature in the knowledge base data store may have an associated tunnel. A tunnel may encompass a single signature, or a tunnel could be defined so as to encompass multiple signatures.

If a signature is characterized as having a value, its associated tunnel may be characterized as having a range of values that includes this signature value. Stated another way, a signature tunnel may be characterized as a buffer of sorts for its corresponding signature. A signature tunnel may be defined in any appropriate manner, for instance by user input (e.g., via the user interface), by one or more algorithms, or both. A signature tunnel may be defined by a +/– value for the associated signature (e.g., if a signature has a value of "5", its tunnel may have a value of +/–"2", or a tunnel of (3, 7) (e.g., a range from "3" to "7")). A signature tunnel may also be expressed as a percentage of its corresponding signature (e.g., +/–"x"%). Although a signature tunnel could be "constant" proceeding along its corresponding signature, a tunnel could have different tunnel values at one or more locations along the corresponding signature (e.g., manually defined through the user interface).

One configuration of the knowledge base data store includes utilizing a training store and a separate processing store. Other configurations may be appropriate. Populating the training store may in turn populate the processing store. Consider the case where each of the training and processing stores utilize a separate binary tree. Adding a node to the training store binary tree may result in one or more associated nodes being added to the processing store binary tree. All associated nodes may be added to the processing store binary tree before another node is added to the training store binary tree.

An order of the training store binary tree may be signature-based. An order of the processing store binary tree may be signature tunnel-based. A node may be added to the training store binary tree and may be representative of the value(s) of a signature. One or more nodes may be added to the processing store binary tree and may be representative of the range of values for the associated signature tunnel. Each such node may be added to the processing store binary tree before another node (associated with another signature) is added to the training store binary tree. Other ways of populating the training store and processing store binary trees may be utilized.

Each of the training store and processing store binary trees may be utilized for comparison against signatures being generated by the signature processing engine from a data set. The training store binary tree may provide a higher degree of specificity than the processing store binary tree. However, the processing store binary tree still should provide a high degree of specificity but with a likely increased processing speed.

Signatures generated by the signature processing engine may be used by the data processing system to provide a plurality of functions. Representative functions available through the data processing system, and which may use these signatures, include without limitation feature extraction (e.g., identifying one or more features in a data set), rendering a new layer (e.g., outputting a presentation of identified features on a display, printer, or the like; each feature in the new layer may be represented by a unique color/shading), pattern recognition, data visualization, and data re-visualization (e.g., determining one or more alternative values for data elements in a data set, and using these alternative values to present a visualization of the data set). Each function provided by the data processing system may be accessible through the user interface.

The data processing system may include one or more displays of any appropriate type. One of the functions available through the data processing system is to present at least some type of visualization or rendering based upon the data set (e.g., output a data presentation, for instance to one or more displays). Multiple data presentation options may be presented on a display and in any appropriate manner (e.g., via a data presentations options protocol). User input (e.g., through the user interface) may be used to enter and/or select a desired data presentation option. Representative data presentation options include without limitation relationship-based data presentation, non-imagery data presentation, and signature-based data presentation.

Relationship-based data presentation may be characterized as rendering a new layer for a data set. In this regard, a signature profile may be used to generate signatures on a data set. Each signature from the data set may be compared with the knowledge base data store to identify the corresponding feature. All instances of an identified feature in the data set may be rendered in a common color (or in a common shade of gray in a grayscale rendering). Different identified features may be rendered in different colors (or in different shades of gray in a grayscale rendering).

The data processing system may also be used to present non-imagery data (e.g., linear data). In this regard, a signature profile may be used to generate signatures on a data set. The signature value(s) for each signature may be used to generate a rendering or otherwise present the corresponding data element (again each signature is associated with a particular data element).

Signature-based data presentation may also be utilized by the data processing system and may be used to determine a color for a data element from a signature for this same data element. One type of signature-based presentation entails generating a plot for each signature. This plot may be divided into a plurality of bands. A threshold may be associated with each of the bands. Although the same threshold could be used for each band, typically the threshold will be different in one or more of the bands (and including in each of the bands). In any case and in one embodiment, the plot is divided into three bands, one for the color red (R value), one for the color green (G value), and another for the color blue (B value). The R, G, and B values are determined for the three bands, respectively, and are utilized to determine a color in which the data element may be displayed.

Another type of signature-based data presentation entails acquiring at least one signature for each of a plurality of data elements to be presented. At least one signature value from each acquired signature may be assigned to one or more of a plurality of color bands. A band color value for each of the plurality of color bands may be determined using the corresponding signature values. A color value for the data element may then be determined from its corresponding band color values. The various data elements may then be presented utilizing their corresponding color value.

A fourth aspect of the present invention relates to signatures. In the case of a data set having a plurality of data elements, a signature may be specific to a particular data element, and may define this data element in relation to one or more other data elements (e.g., from the same data set).

A number of feature refinements and additional features are applicable to the fourth aspect of the present invention. These feature refinements and additional features may be used individually or in any combination in relation to the fourth aspect. The following discussion, up to the discussion of a fifth aspect of the present invention, pertains to the fourth aspect. Initially, the signature of this fourth aspect may be utilized by each of the above-noted first, second, and third aspects. Moreover, although the fourth aspect encompasses a signature for a single data element, it should be appreciated that the fourth aspect is applicable to generating a signature for each of a plurality of data elements (e.g., from a common data set).

The data element defined by its corresponding signature may include a single data point, or may include multiple data points. The data element for which a signature is generated may be referred to as a current or focal data element. Each data element that is used to define a focal data element may be referred to as a surrounding data element, a related data element, or the like. Any number of data elements may be utilized to relationally define a particular focal data element by its signature, including a single data element. Multiple data elements that are used to relationally define a particular focal data element by its signature may be disposed in any appropriate pattern or arrangement. The pattern or arrangement of any data element that is used to relationally define a focal data element may be characterized as being part of a signature profile.

The signature may be defined by a signature profile or an algorithm set. This signature profile or algorithm set includes at least one algorithm. Any appropriate number of algorithms may define a given signature profile. Each algorithm may provide one or more values for a signature that is generated using the corresponding signature profile. If a given signature profile uses multiple algorithms, a signature generated therefrom should have multiple values. A signature may then be characterized as a collection of one or more values. Multiple algorithms that define a given signature profile/algorithm set may be arranged in any appropriate order.

The signature may be characterized as an n-dimensional structure. In one embodiment, the signature may be properly viewed as actually being a zero-dimensional structure. Although the signature may appear to be a linear structure (e.g., defined by a collection of signature values), the signature again pertains to a particular data element, and each signature value associated with the signature may characterize this data element in relation to one or more other data elements. Each related data element may have any relationship to the focal data element (e.g., each related data element could be from any position in a linear data stream relative to a focal data element; each related data element could be any data element in a given two-dimensional data set; a focal data element from one data set could have one or more related data elements from one or more different data sets). Consider the case where a signature is defined by four algorithms, and where each algorithm provides a single signature value. Each signature value may be viewed as a band of the signature—it defines a single data element in relation to one or more other data elements.

The fourth aspect may be implemented in a number of manners. Initially, the signature may be stored on a computer-readable storage medium of any appropriate type. Another implementation is a system (for instance any of the data processing systems discussed above in relation to the first, second, and/or third aspects) that is configured to generate these signatures. Yet another implementation is a method of operating a data processing system, and that includes generating these signatures.

In the implementation of the fourth aspect that is in the form of a method of operating a data processing system, such a data processing system may include a computer-readable storage medium of any appropriate type (including a combination of different types) and that may be distributed in any appropriate manner. An algorithm set is created and resides in the computer-readable storage medium. This algorithm set includes at least one algorithm, and is used to define a signature for what may be characterized as a current data element or a focal data element. The signature for this focal data element will define the focal data element in relation to at least one other data element, and which may be referred to as a surrounding or related data element. At least one value is retrieved from the computer-readable storage medium for each of the focal data element and at least one related data element (including retrieving a value for each related data element). These values are input to the algorithm set to define a signature for the focal data element. The following discussion pertains to this implementation of the fourth aspect, up to the start of a discussion of a fifth aspect of the present invention.

The algorithm set may be created in any appropriate manner. At least one algorithm: 1) may be retrieved from the computer-readable storage medium in any appropriate manner (e.g., in response to user input, for instance through a user interface); 2) may be retrieved from one or more algorithm stores that are stored on or otherwise retained by the computer-readable storage medium (e.g., in response to user input, for instance through a user interface); 3) may be input to the data processing system, for instance through a user interface, an automated system, or the like; and 4) any and all combinations thereof. A single algorithm could define the algorithm set. Multiple algorithms may be utilized for the algorithm set and may be arranged in any appropriate order. Each algorithm in the algorithm set may provide at least one value for the signature.

The data set(s) that includes the focal data element and each of its related data element may be of any appropriate data type, of any appropriate dimension (e.g., n-dimensional data; three-dimensional data; two-dimensional data; one-dimensional data; zero-dimensional data), or both (e.g., in the case of imagery as the data type, representative dimensions include without limitation two, three, and n-dimensions). A data set of a given data type may also be of any appropriate modality (e.g., in the case of imaging as the data type, representative modalities include without limitation photographic, hyperspectral, InSAR, x-ray, CT, PET, etc).

The focal data element and each of its related data elements that is used to define a signature for the focal data element may be of a common data type or of different data types. The focal data element and at least one of its related data elements may be of a common data type, a different data type, or any combination thereof. The focal data element may be from one data set, and at least one of its related data elements may be from another data set. The focal data element and at least one of its related data elements may be from a common data set, including having the focal data element and each of its related data elements being from a common data set.

What may be characterized as a signature set may include a plurality of first signatures. Each such first signature may be specific to a particular first data element and may define this first data element in relation to at least one other data element. The focal data element and each of its related data elements may be part of this signature set. For instance, the focal data element may be in the form of one of the first signatures, and each of its related data elements may be in the form of another of these first signatures (e.g., each related data element may be a different one of the first signatures). Another option is for the focal data element to be defined by part of a plurality of the first signatures, and for each of its related data elements to be defined by a different part of the same plurality of first signatures (e.g., each related data element may be defined by different parts of the same plurality of first signatures).

The identification of each related data element to be utilized for purposes of relationally defining a focal data element may be undertaken in any appropriate manner, and furthermore may be communicated to the data processing system in any appropriate manner (e.g., through providing user input to the data processing system, for instance through a user interface of any appropriate type, such as a graphical user interface). The selection of one or more related data elements to be used to relationally define a focal data element may be characterized as a surrounding or related data element pattern. Such a related data element pattern may be encompassed by a signature profile from which the signature is generated. This signature profile may also include the algorithm set.

A data extractor may be utilized by the data processing system to open at least one data set that includes the focal data element and each of its related data elements. In one embodiment, this data extractor includes at least a data extraction layer, although the data extractor could be in the form of a data extraction layer and a separate iterator. In any case, information pertaining to the signature to be generated for the focal data element (e.g., the particular algorithm set) may be communicated to the data extractor before the values for the focal data element and each of its related data elements are retrieved from at least one data set by the data extractor.

The data processing system may utilize a signature processing engine to generate signatures from values that have been retrieved from at least one data set by the data extractor, and that are thereafter provided to the signature processing engine by the data extractor. The signature processing engine may communicate with the data extractor so that the signature processing engine receives data from the data extractor in a certain manner. For instance, the signature processing engine may communicate the format in which it wishes to receive data from the data extractor, the algorithm(s) that are going to be used to define a signature, or both. This communication may be of any appropriate format, and may be sent from the signature processing engine to the data extractor in any appropriate manner and over any appropriate communication link. In one embodiment, this communication is sent before the data extractor starts processing at least one data set from which a signature is to be generated for one or more of its data elements.

The computer-readable storage medium of the data processing system may include at least one knowledge base data store. Any appropriate number of knowledge base data stores may be utilized by the data processing system. One or more signatures that may be generated in accordance with the fourth aspect may be stored in a knowledge base data store. Signatures from one or more data sets may be incorporated into the same data store. However, it may be desirable for signatures to be grouped or linked by signature profile (e.g., a first data store may incorporate signatures of a first signature profile, and a second data store may incorporate signatures of a second signature profile that is different from the first signature profile). Signatures that are incorporated by a data store may be referred to as "data store signatures." Subsequently generated signatures (e.g., from a different data set) may be compared with the knowledge base data store in conjunction with the provision of various types of functions (e.g., feature extraction, rendering a new data layer for a new data set(s) being processed).

A tunnel may be created for a signature that is generated in accordance with the fourth aspect. The discussion presented above on tunnels in relation to the first, second, and third aspects is equally applicable to this fourth aspect. Summarily, a signature tunnel may be created in any appropriate manner. User input may be provided to the data processing system (e.g., through an appropriate user interface) to create a signature tunnel. A signature tunnel could be automatically defined for its associated signature (e.g., via one or more algorithms). Such an automatically defined signature tunnel, as well as any existing signature tunnel, may be manually manipulated by a user (e.g., through a user interface). User input may be provided to manually adjust one or more aspects of a given signature tunnel.

A fifth aspect of the present invention is directed toward presenting data (e.g., on a display, on a printout). A plot that is representative of a current data element is generated and divided into a plurality of bands. A band color value is determined for each of these bands. Each of these band color values is combined into a current data element color value. The current data element is presented using its corresponding current data element color value.

A sixth aspect of the present invention is directed toward presenting data (e.g., on a display, on a printout). A color is determined for each of a plurality of data elements. The data element for which a color is to be determined may be referred to as a "current data element." A signature is derived for each current data element. This signature defines its corresponding current data element in relation to at least one surrounding or related data element. The signature for each current data element is plotted and divided into a plurality of bands. A band color value is determined for each of these bands and on a plot-by-plot basis. Each of the band color values for each plot is combined into a data element color value for the corresponding current data element. The plurality of data elements may be presented (e.g., simultaneously) using their corresponding data element color value.

A number of feature refinements and additional features are separately applicable to each of above-noted fifth and sixth aspects of the present invention. These feature refinements and additional features may be used individually or in any combination in relation to each of the fifth and sixth aspects. The following discussion pertains to the fifth and sixth aspects, up to the start of a discussion of a seventh aspect of the present invention. Initially, the data processing system discussed above in relation to each of the first, second, and third aspects may be used in the implementation of the fifth and sixth aspects (e.g., a computerized data processing system).

In one embodiment, the plot that is generated for each current data element is presented or output onto an appropriate display. The plot that is generated and representative of the current data element may define the current data element in relation to at least one other data element, and including in relation to a plurality of other data elements (e.g., one or more surrounding or related data elements). This may be a plot of a signature for the current data element in accordance with the foregoing. As such, the foregoing discussion of signatures (e.g., the fourth aspect) is applicable to each of the fifth and sixth aspects.

The generation of a plot that is representative of a current data element may include plotting values from execution of an algorithm set or signature profile. This algorithm set may include at least one algorithm. Each algorithm of the algorithm set may provide at least one value for the corresponding plot. At least one value that is associated with the current data element may be an input for at least one of the algorithms of the algorithm set, and including for each algorithm of the algorithm set. The same value from the corresponding current data element could be input to each algorithm, a different value from the corresponding current data element could be input to each algorithm, or a particular value from the corresponding current data element could be input to one or more of the algorithms and a different value from the corresponding current data element could be input to one or more of the algorithms. Similarly, at least one value that is associated with each of the other data elements that are used to define the current data element may be an input for at least one of the algorithms of the algorithm set, and including for each algorithm of the algorithm set. The same value from the corresponding related data element could be input to each algorithm, a different value from the corresponding related data element could be input to each algorithm, or a particular value from the corresponding related data element could be input to one or more of the algorithms and a different value from the corresponding related data element could be input to one or more of the algorithms.

A different color may be associated with each of the different bands for each corresponding plot. The plot may be divided into first, second, and third bands. A first color value may be determined for the first band, a second color value may be determined for the second band, and a third color value may be determined for the third band. In one embodiment, the first color value is a red color value (i.e., an "R value"), the second color value is a green color value (i.e., a "G value"), and the third color value is a blue color value (i.e., a "B value"). As such, the color for the current data element may be defined by RGB values.

A certain color may be associated with each band. The band color value (e.g., for an assigned color) for each of the bands of each given plot may be determined in any appropriate manner. In one embodiment, the band color value for each of the plurality of bands is arithmetically determined. In one embodiment, each band is divided into a plurality of bits (e.g., eight bits), a band color value is determined for each of these bits, and the band color value for the plurality of bits are averaged to determine the band color value for the corresponding band.

A threshold may be established for each of the plurality of bands. This threshold may be utilized to determine the band color value for each of the bands. For instance, the threshold in one band may be used to determine the R value of each bit in the corresponding band, the threshold in another band may be used to determine the G value of each bit in the corresponding band, and the threshold in another band may be used to determine the B value of each bit in the corresponding band. A different threshold may be used for each of the bands. The threshold may be the same for at least two of the bands. The same threshold could also be used for each of the bands. User input may be utilized to define the threshold for each of the bands. In one embodiment, bit values that are below the corresponding threshold are assigned a value of zero.

As noted, the fifth and sixth aspects may be implemented by the data processing system discussed above in relation to each of the first, second, and third aspects. User input (e.g., via a user interface) may be used to select a data presentation option. For instance, one or more presentation options may be presented on a display of the data processing system (e.g., via one or more tabs; via a drop-down menu). The data processing system could be configured to provide default bands into which each plot is divided for purposes of the fifth and sixth aspects. User input (e.g., via a user interface) could be used to modify these default bands, or user input could be used to initially establish the bands into which each plot is to be divided. The data processing system could be configured to provide default thresholds for each band of each plot for purposes of the fifth and sixth aspects. User input (e.g., via a user interface) could be used to modify these default thresholds, or user input could be used to initially establish the thresholds for each of the bands for each given plot. In the case where a data set is visualized in accordance with either of the fifth and sixth aspects, the same band and threshold parameters would typically be used for the entire data set.

A seventh aspect of the present invention is directed toward presenting data. At least one data set is opened. Presentation values are generated for each of a plurality of data elements from the opened data set(s). The data element for which a presentation value is being generated may be referred to as a current data element. At least one signature is acquired for the current data element. Each signature defines the current data element in relation to at least one other data element, and each signature for the current data element includes at least one signature value. At least one signature value from one or more of the acquired signatures for the current data element is assigned to one or more of a plurality of color bands. A band color value may be determined for each of the plurality of color bands after the assignment of signature values has been completed. The band color values from the various color bands may be combined into and/or used to derive a color value for the current data element, and which may be characterized as the presentation value for the current data element. In any case, the plurality of data elements may be presented using their corresponding color value.

A number of feature refinements and additional features are applicable to the seventh aspect of the present invention. These feature refinements and additional features may be used individually or in any combination in relation to the seventh aspect. The following discussion pertains to the seventh aspect, up to the start of a discussion of an eighth aspect of the present invention. The data processing system discussed above in relation to each of the first, second, and third aspects may be used in the implementation of the seventh aspect (e.g., a computerized data processing system). Moreover, the presentation of the various data elements according to their presentation value may be undertaken in any appropriate manner, such as by being output to one or more displays, to a printer, or the like.

As this seventh aspect of the present invention utilizes signatures, the foregoing discussion of signatures (e.g., the fourth aspect) is also applicable to this seventh aspect. Signatures for the current data element may be acquired in any appropriate manner, such as from a signature processing engine, from a knowledge base data store, from a signature store, or the like. One or more signatures may be acquired for the same current data element (e.g., one signature may have been generated from one data type and/or from one sensor, and another signature may have been generated from another data type and/or from another sensor). All or a portion of a single signature or of multiple signatures may be used to determine a color value for a given current data element.

Generally, one or more of the acquired signature values may each be assigned to only one of the color bands (e.g., it may be such that a first signature value is only assigned to a single color band), one or more of the acquired signature values may each be assigned to multiple color bands (e.g., it may be such that a first signature value is assigned to both a first color band and a second color band), or both. Any appropriate number of color bands may be utilized. In one embodiment, an RGB color model is used. Therefore, there would be a red color band, a green color band, and a blue color band to which signature values (relating to the current data element) may be assigned.

A single signature (again, representative of the current data element) may be used to define a color value in which a current data element may be presented. One or more of the signature values of this single signature may be assigned to one or more of the color bands. Although each of the signature values of this single signature could be assigned to one or more of the color bands, such may not be the case in each instance. Less than all of the signature values of the single signature may be assigned to one or more of the color bands in a given embodiment.

At least two signatures may be acquired for a given current data element. One or more of the signature values from two signatures may be assigned to one or more of the color bands. Although each of the signature values from two signatures could be assigned to one or more of the color bands, such may not be the case in each instance. Less than all of the signature values from two signatures may be assigned to one or more of the color bands in a given embodiment.

Consider the case where first and second signatures are acquired for the current data element. At least one signature value from the first signature may be assigned to one or more of the color bands. Similarly, at least one signature value from the second signature may be assigned to one of more of the color bands. Although each of the signature values from the first signature, the second signature, or both, could be assigned to one or more of the color bands, such may not be the case in each instance. Less than all of the signature values from the first signature, the second signature, or both, may be assigned to one or more of the color bands in a given embodiment.

A first signature may be acquired for the current data element. Each signature value from the first signature may be assigned to one or more of the color bands. Each of the signature values from the first signature could be assigned to a different one of the multiple color bands. At least one signature value from the first signature could be assigned to two or more of the color bands. One or more of the signature values from the first signature could each be assigned to a different color band, one or more of the signature values from the first signature could each be assigned to a common color band, or both. Although each of the color values for the first signature may be assigned to one or more of the color bands, such may not be the case in each substance. For instance, a first signature value of the first signature could be assigned to one or more of the color bands, and a second signature value of the first signature may not be assigned to any of the color bands.

Each color band may have one or more assigned signature values. Each color band may have a plurality of assigned signature values. One or more color bands may have a single assigned signature value, one or more of the color bands may have multiple assigned signature values, or both. Any appropriate number of signature values may be assigned to each color band. Although the same number of signature values could be assigned to each color band, such may not be the case in a given embodiment. Each color band may have any appropriate number of assigned color values.

The signature values within one or more of the color bands may be ordered. This ordering of signature values within a color band may be undertaken on any appropriate basis, including without limitation on an automated basis, in response to user input, or both. The ordering of the signature values within each of the color bands may establish or determine the color for the associated color band.

Each signature value that is assigned to one or more of the color bands may define a bit for a color band to which it is assigned. A first signature value that is assigned to a first color band may define one of its bits. This same first signature value could be assigned to a second color band and could define one of its bits as well. In any case, an ordering of the bits within each color band may be used to establish or determine a color for the corresponding color band. The first bit of a given color band may have more influence on the resulting color of this color band than the second bit, the second bit of this same color band may have more influence on the resulting color of this color band than the third bit, and so forth (e.g., the ordering of bits may define a progressively reduced weighting, with lower-ordered bits have less weight than higher-ordered bits in relation to the resulting color). In one embodiment, each color band includes eight bits. Any appropriate number of bits may be included in each color band.

A threshold may be established/provided for each signature value that is assigned to at least one color band. Although each signature value from a common signature could utilize the same threshold, one or more of the signature values from a common signature could have their own threshold. Each such threshold may be established/provided in any appropriate manner, such as on an automated basis, in response to user input, or both. These thresholds may be used to establish an on/off status for each of the above-noted bits in each of the color bands. Different combinations of on/off bits in a given color band will change the resulting color of the color band.

An eighth aspect of the present invention is directed toward presenting data. At least one data set is opened. Presentation values are generated for each of a plurality of data elements from the opened data set(s). The data element for which a presentation value is being generated may be referred to as a current data element. At least one signature is acquired for the current data element. Each signature defines the current data element in relation to at least one other data element, and each signature for the current data element includes at least one signature value. A presentation value for the current data element is determined, and is based at least upon one of the signature values from at least one of the acquired signatures for the current data element. The plurality of data elements is presented using their corresponding presentation value.

A number of feature refinements and additional features are applicable to the eighth aspect of the present invention. These feature refinements and additional features may be used individually or in any combination in relation to the eighth aspect. The following discussion pertains to the eighth aspect, up to the start of a discussion of a ninth aspect of the present invention. The data processing system discussed above in relation to each of the first, second, and third aspects may be used in the implementation of this eighth aspect (e.g., a computerized data processing system). Each of the fifth, sixth, and seventh aspects may be used to determine the presentation value for each of the plurality of data elements in accordance with this eighth aspect.

As this eighth aspect of the present invention utilizes signatures, the foregoing discussion of signatures (e.g., the fourth aspect) is also applicable to this eighth aspect. Signatures for the current data element may be acquired in any appropriate manner, such as from a signature processing engine, from a knowledge-based data store, from a signature store, or the like. One or more signatures may be acquired for the same current data element (e.g., one signature may have been generated from one data type and/or from one sensor, and another signature may have been generated from another data type and/or from another sensor). All or a portion of a single signature or of multiple signatures may be used to determine a presentation value for a given current data element.

A signature profile or algorithm set may be used to define each signature. One or more of the signatures that are acquired for a current data element may be generated from the same signature profile, one or more of the signatures that are acquired for a current data element may be generated from different signature profiles, or both. A signature profile may be defined by one or more algorithms. Execution of each algorithm of a signature profile may define a signature for the current data element (e.g., providing a collection of one or more signature values).

An entirety of one or more signatures for the current data element may be used to determine its presentation value. Part of one or more signatures for the current data element may be used to determine its presentation value. An entirety of one or more signatures for the current data element, as well as part of one or more signatures for the current data element, may be used to determine its presentation value. The presentation value for each of said plurality of data elements to be presented may be in the form of a color value. The presentation of the various data elements according to their presentation value may be undertaken in any appropriate manner, such as by being output to one or more displays, to a printer, or the like.

A ninth aspect of the present invention is directed toward presenting data or outputting a data presentation. A first data set having a plurality of data elements is opened. This first data set is non-imagery data that may be one-dimensional, two-dimensional, three-dimensional, and/or n-dimensional. In any case, a value re-characterization is undertaken in relation to the first data set using programmed software, at least one processor, or a combination thereof. The data element which is being re-characterized may be referred to as a current data element. This value-re-characterization includes retrieving a first value that is associated with the current data element, deriving a second value based at least in part upon the retrieved first value, and associating this second value with the current data element. Those data elements having a re-characterized second value may be presented utilizing their corresponding second value.

A number of feature refinements and additional features are applicable to the ninth aspect of the present invention. These feature refinements and additional features may be used individually or in any combination in relation to the ninth aspect. The following discussion pertains to at least the ninth aspect of the present invention. Initially, the data processing system discussed above in relation to each of the first, second, and third aspects may be used in the implementation of this ninth aspect (e.g., a computerized data processing system).

The second value for each current data element may be derived in any appropriate manner. Any appropriate algorithm that uses at least a first value for a current data element as an input may be used to derive a second value for the current data element. A signature profile could also be used to determine a second value for a current data element based upon its corresponding first value. Execution of the one or more algorithms that define this signature profile may therefore define a signature for a current data element, where this signature has one or more signature values and defines the current data element in relation to at least one other data element. The second value for a current data element may be a corresponding signature value. As such, the foregoing discussion of signatures (e.g., the fourth aspect) is applicable to this ninth aspect.

The presentation of the various data elements according to their re-characterized second values may be undertaken in any appropriate manner, such as by being output to one or more displays, to a printer, or the like. The ninth aspect may be characterized as creating a new data set or layer (a collection of re-characterized second values for the associated data elements). This new data set or layer may be output as a data presentation using the various re-characterized second values in accordance with the ninth aspect.

Each of the various aspects of the invention may be used individually or in any appropriate combination. Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a data processing system includes "a knowledge base data store" alone does not mean that the data processing system includes only a single knowledge base data store). Moreover, any failure to use phrases such as "at least one" also does not limit the corresponding feature to the singular (e.g., indicating that a data processing system includes "a knowledge base data store" alone does not mean that the data processing system includes only a single knowledge base data store). Use of the phrase "at least generally" or the like in relation to a particular feature encompasses the corresponding characteristic and insubstantial variations thereof (e.g., indicating that a structure is at least generally cylindrical encompasses the structure being cylindrical). Finally, a reference of a feature in conjunction with the phrase "in one embodiment" does not limit the use of the feature to a single embodiment.

BRIEF DESCRIPTION OF THE FIGURES

FIG. 11 is a schematic of one embodiment of a label for one of the nodes in the processing store binary tree of the data store used by the data processing system of FIG. 1.

DETAILED DESCRIPTION

Figure 1:
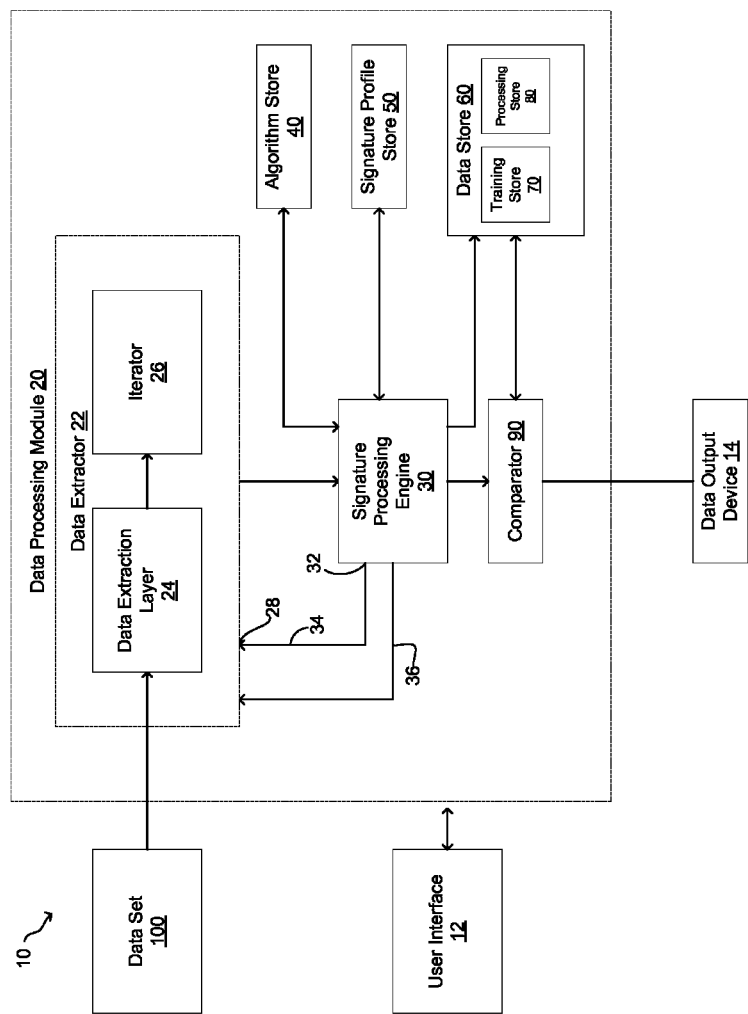
FIG. 1 is a block diagram of one embodiment of a data processing system.

FIG. 1 illustrates one embodiment of a data processing system 10. Generally, signatures 190 (e.g., FIGS. 2B and 2C) are generated from a data set 100 (e.g., FIG. 2A) that is opened by the data processing system 10. These signatures 190 may be utilized to provide a variety of functions that will be addressed herein. Some introductory background information on the data set 100 and signatures 190 will be provided before addressing the components and functionality of the data processing system 10.

Figure 2A:
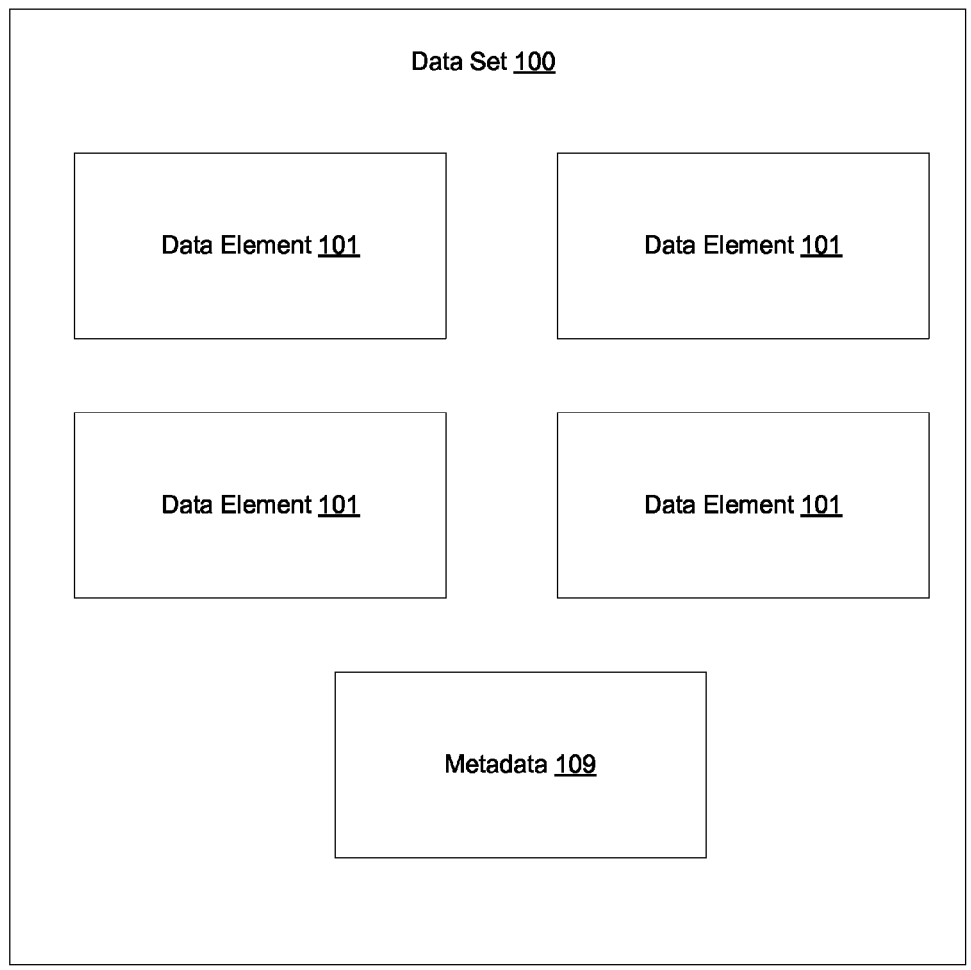
FIG. 2A is a block diagram of one embodiment of a data set that may be opened by the data processing system of FIG. 1.

A block diagram of the data set 100 is shown in FIG. 2A. The data set 100 includes a plurality of individual data elements 101. Each data element 101 may be of an "atomic" or "atomic-like" structure or nature—something that cannot be subdivided. However, each data element 101 may be composed of a number of bands of data. In any case, any appropriate number of data elements 101 may define the data set 100. The data embodied by each of the individual data elements 101 may be of any appropriate type. The data set 100 may also be configured in any appropriate data format. Representative data formats for the data set 100 include without limitation zero, one, two, three, and n-dimensional data. Any appropriate metadata 109 may also be associated with the data set 100 in any appropriate manner. Representative metadata 109 includes without limitation machine data, sensor data, last maintenance data point location, capture date, and capture time.

Figure 2B:
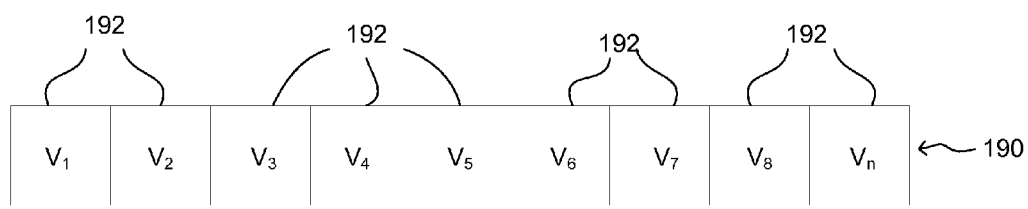
FIG. 2B is one schematic representation of one embodiment of a signature that may be generated by the data processing system of FIG. 1.
Figure 2C:
FIG. 2C is another schematic representation of one embodiment of a signature that may be generated by the data processing system of FIG. 1.

Signatures 190 are generated from the data set 100 by the data processing system 10 of FIG. 1. Two representative depictions of such a signature 190 are shown in FIGS. 2B and 2C. Generally, each signature 190 defines a data element 101 of the data set 100 in relation to one or more other data elements 101 of the data set 100 or metadata elements. These "other" data elements 101, while not necessarily in a uniform surrounding format, may be referred to as "surrounds" or "surrounding data elements" or "related data elements" throughout this description. As such, a signature 190 is specific to a particular data element 101, but includes information about other data elements 101. In any case, each signature 190 is defined by a plurality of algorithm or signature values 192. A plot of one embodiment's representative signature values 192 is depicted by the signature 190 of FIG. 2C. Any appropriate number of signature values 192 may define a given signature 190.

A signature 190 may be characterized as an n-dimensional structure. In one embodiment, a signature may be properly viewed as actually a zero-dimensional structure. Although a signature 190 may appear to be a linear structure (e.g., defined by a collection of signature values 192), the signature 190 again pertains to a particular data element 101, and each signature value 192 associated with the signature 190 may characterize this data element 101 in relation to one or more other data elements 101. Consider the case where a signature 190 is defined by four algorithms 42, and where each algorithm 42 provides a single algorithm or signature value 192. Each signature value 192 may be viewed as a band of the signature 190—it defines a single data element 101 in relation to one or more other data elements 101.

Figure 2D:
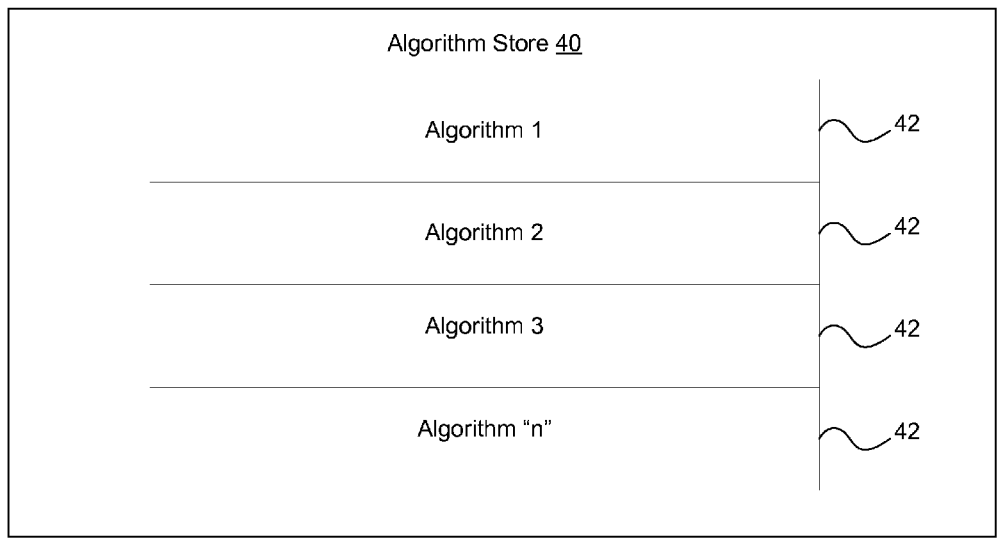
FIG. 2D is a schematic of one embodiment of the algorithm store used by the data processing system of FIG. 1.

Values for one or more of the data elements 101 of the data set 100 are used as inputs to one or more algorithms that are executed by the data processing system 10 of FIG. 1 to generate the signature values 192 for a given signature 190. FIG. 2D shows one embodiment of an algorithm store 40 that may be used by the data processing system 10 of FIG. 1, and that may include a plurality of algorithms 42 from which signatures 190 may be defined. Any appropriate number of algorithms 42 may be retained within the algorithm store 40, and an appropriate identifier may be provided for each such algorithm 42. Each algorithm 42 may be of any appropriate type (e.g., for calculating a mean, for calculating a spread such as a standard deviation, K-nearest neighbor, and logical attribute compliance). Each algorithm 42 may provide one or more signature values 192 for a given signature 190. The output of multiple algorithms 42 may provide the signature values 192 for a given signature 190. It should be appreciated that re-ordering the output of the same set of algorithms 42 may provide a different signature 190 based upon the same inputs from the data set 100, although simply re-ordering the algorithms 42 may not have a substantial impact on subsequent utilizations of the signature 190.

Figure 2E:
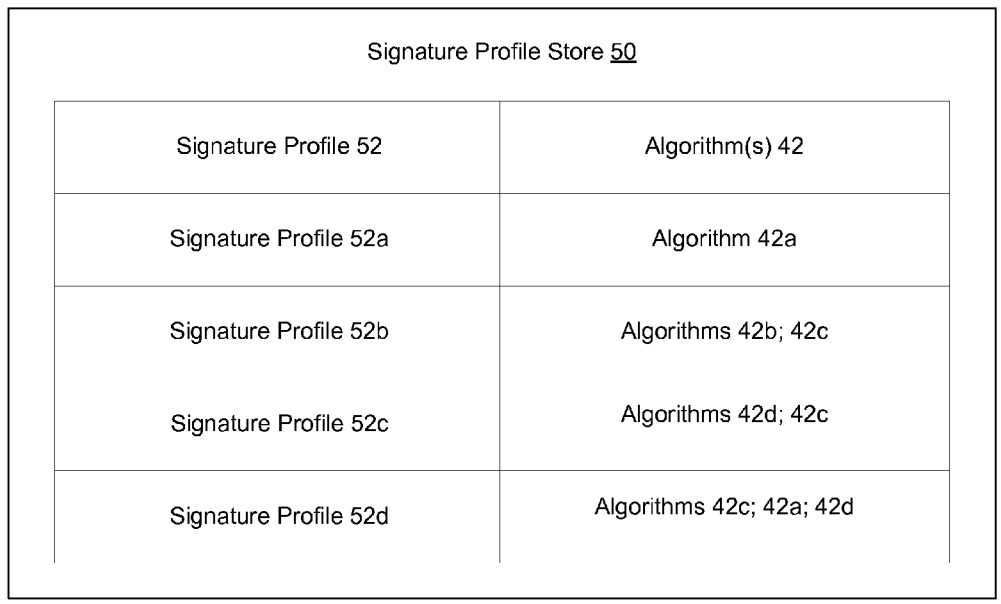
FIG. 2E is a schematic of one embodiment of the signature profile store used by the data processing system of FIG. 1.

The collection or set of algorithms 42 that may be used to generate a given signature 190 may be referred to as a "signature profile." FIG. 2E shows one embodiment of a signature profile store 50 that may be used by the data processing system 10 of FIG. 1, and that may include one or more signature profiles 52. Any appropriate number of signature profiles 52 may be retained within the signature profile store 50. Signature profile 52a is defined by the output of a single algorithm 42a. Signature profile 52b is defined by the output of algorithms 42b and 42c. Signature profile 52c is defined by the output of algorithms 42d and 42c. Finally, signature profile 52d is defined by the output of algorithms 42c, 42a, and 42d. These are merely representative examples of signature profiles 52.

Figure 2F:
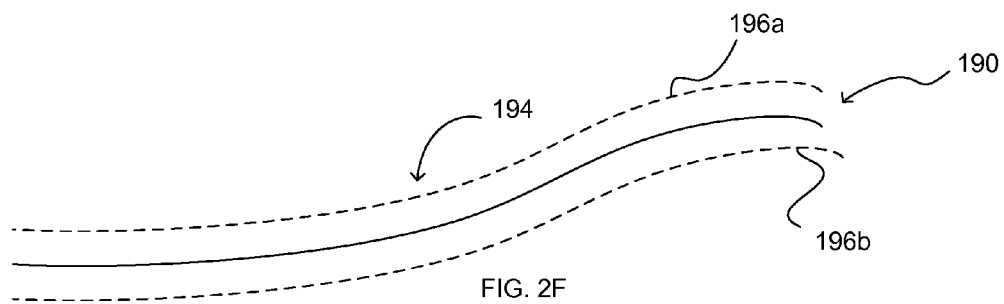
FIG. 2F is one schematic representation of one embodiment of a signature and an associated tunnel that may be defined/utilized by the data processing system of FIG. 1.
Figure 2G:
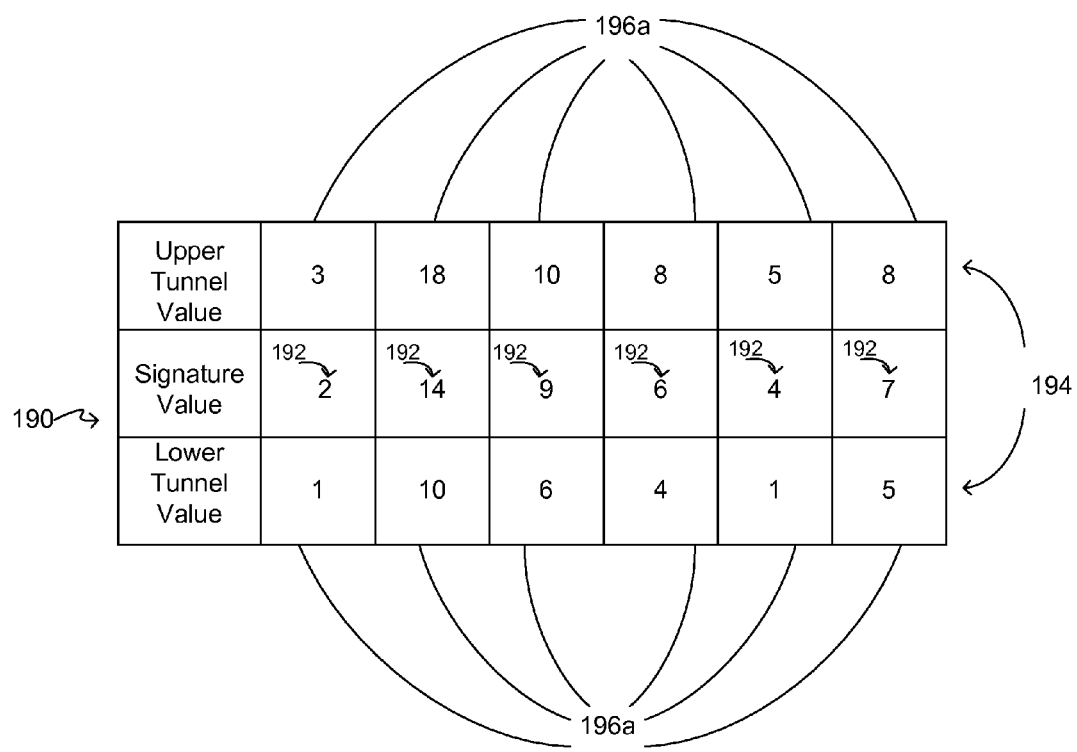
FIG. 2G is another schematic representation of one embodiment of a signature and an associated tunnel that may be defined/utilized by the data processing system of FIG. 1.

A tunnel may be provided for one or more signatures 190 generated by the data processing system 10. A representative tunnel for a signature 190 is shown in each of FIGS. 2F and 2G, and is identified by reference numeral 194. Generally, a signature tunnel 194 may be characterized as a "buffer" for its corresponding signature 190. In FIG. 2F (a graphical example of a zero-dimensional signature 190), the signature tunnel 194 is defined by an upper signature total limit 196a (the uppermost dashed line) and a lower signature tunnel limit 196b (the lowermost dashed line). In FIG. 2G where the signature 190 is defined by five enumerated signature values 192, there is a specified value for the upper signature tunnel limit 196a and a specified value for the lower signature tunnel limit 196b for each such signature value 192.

A signature tunnel 194 may be defined in any appropriate manner for its corresponding signature 190. The signature tunnel 194 could be expressed as a "+/−" percentage of its corresponding signature 190 or signature values 192. The upper and lower tunnel limits 196a and 196b could be the same or different. One percentage of the signature 190/corresponding signature value 192 could define the upper signature tunnel limit 196a, while another percentage of the signature 190/corresponding signature value 192 could define the lower signature tunnel limit 196b. Another option is to define the signature tunnel 194 for a signature 190 via an algorithm (both its upper signature tunnel limit 196a and its lower signature tunnel limit 196b). Yet another option is to allow a user to manually define one or more values for the signature tunnel 194. Although the signature tunnel 194 could provide a "uniform buffer" for the entirety of a signature 190, such need not be the case. The signature tunnel 194 could provide one variance at one location along the signature 190, and could provide a different variance at another location of the signature 190.

Although a signature 190 may be characterized as being a subset of its corresponding signature tunnel 194 in at least some instances, such may not always be the case. One or more parts of a signature 190 may be within its corresponding signature tunnel 194, one or more parts of a signature 190 may outside of its corresponding signature tunnel 194, or both. For instance, a signature 190 may be defined in one band of data (e.g., data on a plurality of data elements 101 from one sensor), and its signature tunnel 194 may in effect be transposed into a different band of data (e.g., different data on the same plurality of data elements 101, but from a different sensor). In such a case it may be that the signature tunnel 194 does not actually include its associated signature 190.

At least one possible configuration for a data processing system 10 will now be described in relation to FIG. 1. Various details regarding the functionality provided by the data processing system 10 will be addressed in more detail below in relation to the remaining figures. However and as previously noted, the data processing system 10 may generate a number of signatures 190 from a data set 100 that has been uploaded by the data processing system 10.

Components of the data processing system 10 of FIG. 1 include a data processing module 20, a user interface 12, and a data output device 14. The user interface 12 may be one or more components of any appropriate type, for instance in the form of a graphical user interface, one or more data input devices (e.g., keyboard, mouse), and the like. Various user inputs may be provided through the user interface 12 for use by the data processing system 10. The data output device 14 may be one or more components of any appropriate type as well, for instance in the form of a computer monitor or display, a printer, or the like. Processed results from the data processing system 10 may be provided or presented to a user through the data output device 14.

The data processing module 20 from the data processing system 10 of FIG. 1 may be implemented in any appropriate manner, including using one or more platforms, one or more computers, one or more processors, hardware, software, firmware, or any combination thereof. Multiple components of the data processing module 20 may be distributed in any appropriate manner. Generally, the data processing module 20 may provide one or more functions in relation to a data set 100 that has been uploaded by the data processing system 10 in an appropriate manner.

The data processing module 20 includes a data extractor 22, a signature processing engine 30 (e.g., one or more processors), a comparator 90 (e.g., one or more processors), an algorithm store 40 (e.g., any appropriate data storage device or combination of data storage devices, but in the form of a computer-readable storage medium), a signature profile store 50 (e.g., any appropriate data storage device or combination of data storage devices, but in the form of a computer-readable storage medium), and a data store 60 (e.g., any appropriate data storage device or combination of data storage devices, but in the form of a computer-readable storage medium). The data extractor 22 may be in the form of a data extraction layer 24 and a separate iterator 26. Multiple functions may be provided by the data extraction layer 24. For instance, the data extraction layer 24 may be utilized to extract actual data (e.g., a pixel value for the corresponding data element 101) and metadata 109 from the data set 100. The data extraction layer 24 may also organize the data set 100 and create the iterator 26 in a manner required/specified by the signature processing engine 30 (e.g., via user input provided through the user interface 12).

The signature processing engine 30 may be characterized as having a data extractor communication port 32, while the data extractor 22 (e.g., the data extraction layer 24) may be characterized as having a signature processing engine communication port 28. A signature profile communication link 34 of any appropriate type may extend between the signature processing engine 30 (e.g., the data extractor communication port 32) and the data extractor 22 (e.g., the signature processing engine communication port 28). Information required by the data extraction layer 24 in order to create the iterator 26 for the signature processing engine 30 may be communicated to the data extraction layer 24 by the signature processing engine 30 over this signature profile communication link 34. Generally, this information may relate to how the signature processing engine 30 is going to process the data set 100 (e.g., which signature profile 52 is going to be used by the signature processing engine 30), along with data format requirements in order for the signature processing engine 30 to process the data set 100 in an intended/specified manner (e.g., the signature processing engine 30 may communicate with the data extraction layer 24 has to how it wants to receive data for processing).

The iterator 26 may sequence through the data set 100 provided by the data extraction layer 24. The data extraction layer 24 may format the data set 100 in a manner so as to simplify the iteration logic (and as specified by the signature processing engine 30). However, the iterator 26 may provide the function of formatting the data set 100 in a manner that is specified by the signature processing engine 30. For instance and in the case of two-dimensional data, the iterator 26 may put the raw data from the data set 100 into an $x_1, y_1, x_2, y_2, x_3, y_3, x_n, y_n$ format. Moreover, the iterator 26 may sequence through the data set 100 in a manner specified by the signature processing engine 30, and in any case may provide data to the signature processing engine 30 in a manner specified by the signature processing engine 30. The iterator 26 provides both the actual data (e.g., the pixel value for each data element 101) and any associated metadata 109 associated with the data set 100 (e.g., FIG. 2A) to the signature processing engine 30. Either the data extraction layer 24 or the signature processing engine 30 may drive the iterator 26 (e.g., "driving" the iterator 26 may be defined as retrieving the actual data and associated metadata from each position of the iterator 26).

The signature processing engine 30 may generate one or more signatures 190 (e.g., FIGS. 2B and 2C) from the data set 100 (e.g., FIG. 2A). Again and as will be discussed in more detail below, each such signature 190 may be in the form of a zero-dimensional structure that defines a data element 101 from the data set 100 in relation to one or more other data elements 101 of the data set 100 (e.g., "surrounding" data elements 101). In this regard, the signature processing engine 30 may be configured to communicate with the algorithm store 40. One or more algorithms 42 may be retrieved from the algorithm store 40 and may be ordered to define a signature profile 52 or an algorithm set. Signature profiles 52 that have been compiled may be stored in the signature profile store 50 for re-use at a later time.

Signatures 190 (e.g., FIGS. 2B and 2C) that are generated from the data set 100 by the signature processing engine 30 may be stored in the data store 60, in other memory, or both. The data store 60 may be configured to have both a training store 70 and a processing store 80. Signature values 192 from the signatures 190 may be stored in the training store 70. Signature tunnels 194 may be stored in the processing store 80. Details of how both the training store 70 and processing store 80 may be configured and populated are provided below in relation to FIGS. 10-16B).

The data store 60 may be characterized as providing a "knowledge base" for assessing data that is process by the data processing system 10. As discussed, this data may be in the form of a data set 100 having a plurality of data elements 101 (e.g., FIG. 2A). FIG. 1 also illustrates that signatures 190 (e.g. FIGS. 2B and 2C) previously generated by the signature processing engine 30 may be utilized as "raw data" by the data extractor 22 (e.g., via a signature feedback communication link 36 of any appropriate type). In any case and as previously noted, the data processing system 10 includes a comparator 90 of any appropriate configuration/type (e.g., one or more processors). Generally, each signature 190 that is generated from data provided by the data extractor 22 to the signature processing engine 30 may be compared with the data store 60 to provide one or more functions.

Figure 3:
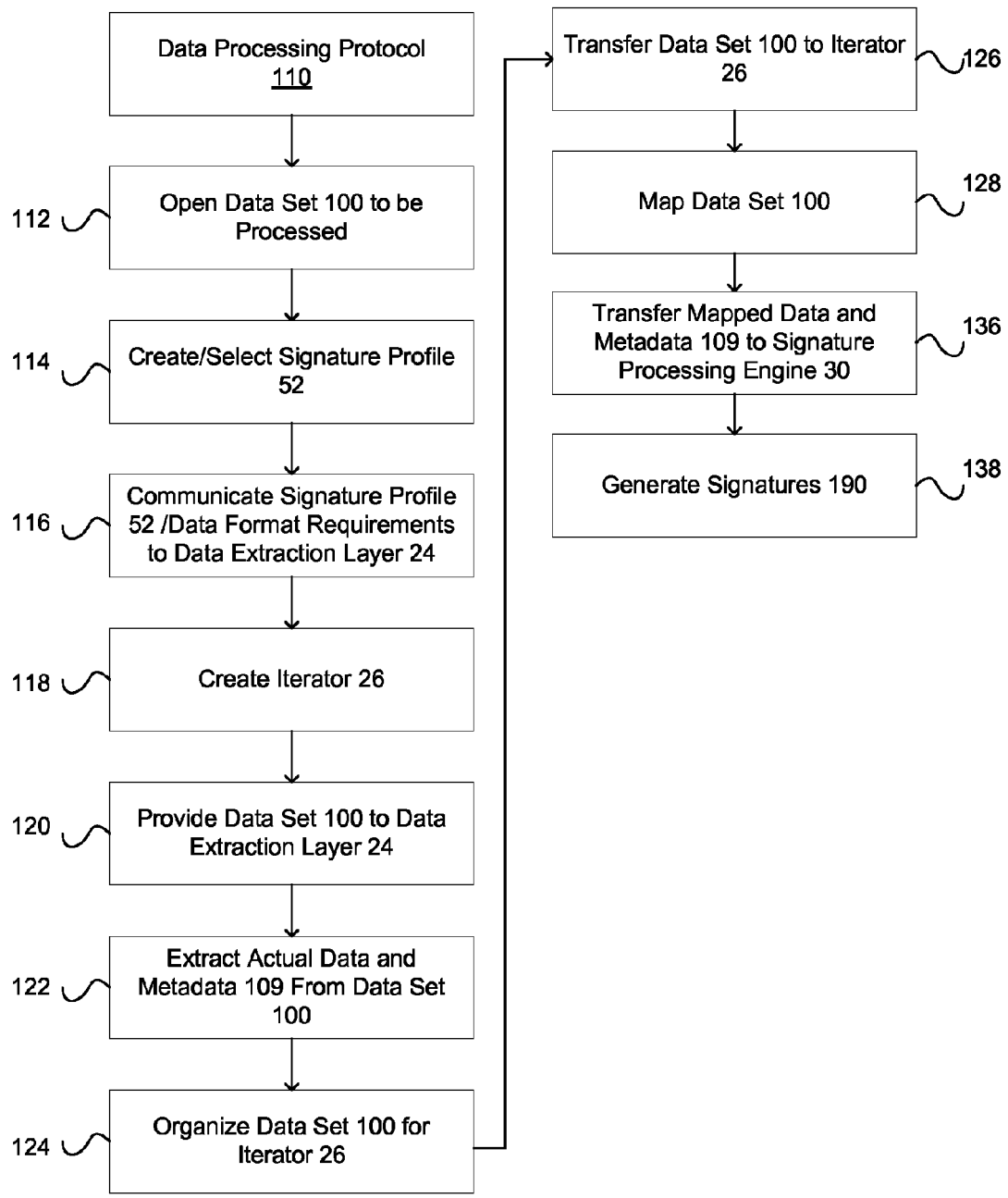
FIG. 3 is a flowchart of one embodiment of a data processing protocol that may be used by the data processing system of FIG. 1.

One embodiment of a data processing protocol is illustrated in FIG. 3, is identified by reference numeral 110, and may be integrated in any appropriate manner by the data processing system 10 of FIG. 1. The data processing protocol 110 includes opening a data set 100 that is to be processed (step 112). A signature profile or algorithm set 52 may be created or selected in association with step 114. A signature profile 52 again is defined by one or more algorithms 42 that may be arranged in a certain order, with each algorithm 42 outputting at least one value (i.e., a signature value 192) that ultimately defines the corresponding signature 190. A user could manually input one or more algorithms 42 through the user interface 12, a user could select one or more algorithms 42 from the algorithm store 40 through the user interface 12, or both, to define a desired signature profile 52 for purposes of step 114.

The signature profile 52 is communicated to the data extraction layer 24 in association with step 116 of the data processing protocol 110 (e.g., via the signature profile communication link 34 of the data processing system of FIG. 1). Data formatting requirements may also be communicated to the data extraction layer 24 in association with step 116 (e.g., via the signature profile communication link 34 in FIG. 1). These communications may be provided by the signature processing engine 30 (e.g., based upon user input provided through the user interface 12). An iterator 26 is created in association with step 118 (e.g., based upon the requirements of the signature processing engine 30).

The data set 100 may be provided to the data extraction layer 24 (step 120). Both actual data (one or more values associated with each of the data elements 101 from the data set 100) and metadata 109 may be extracted from the data set 100 (step 122). The data set 100 may be organized (step 124) and transferred to the iterator 26 (step 126). The data set 100 may be formatted in association with step 128. The formatted data and metadata 109 may be provided to the signature processing engine 30 (step 136). Signatures 190 may be generated by the signature processing engine 30 in association with step 138. Generally, one or more of these signatures 190 may be added to the data store 60 for analysis of subsequently-generated signatures 190, may be analyzed in relation to the data store 60 to provide one or more functions, or may be used to visualize data.

Figure 4:
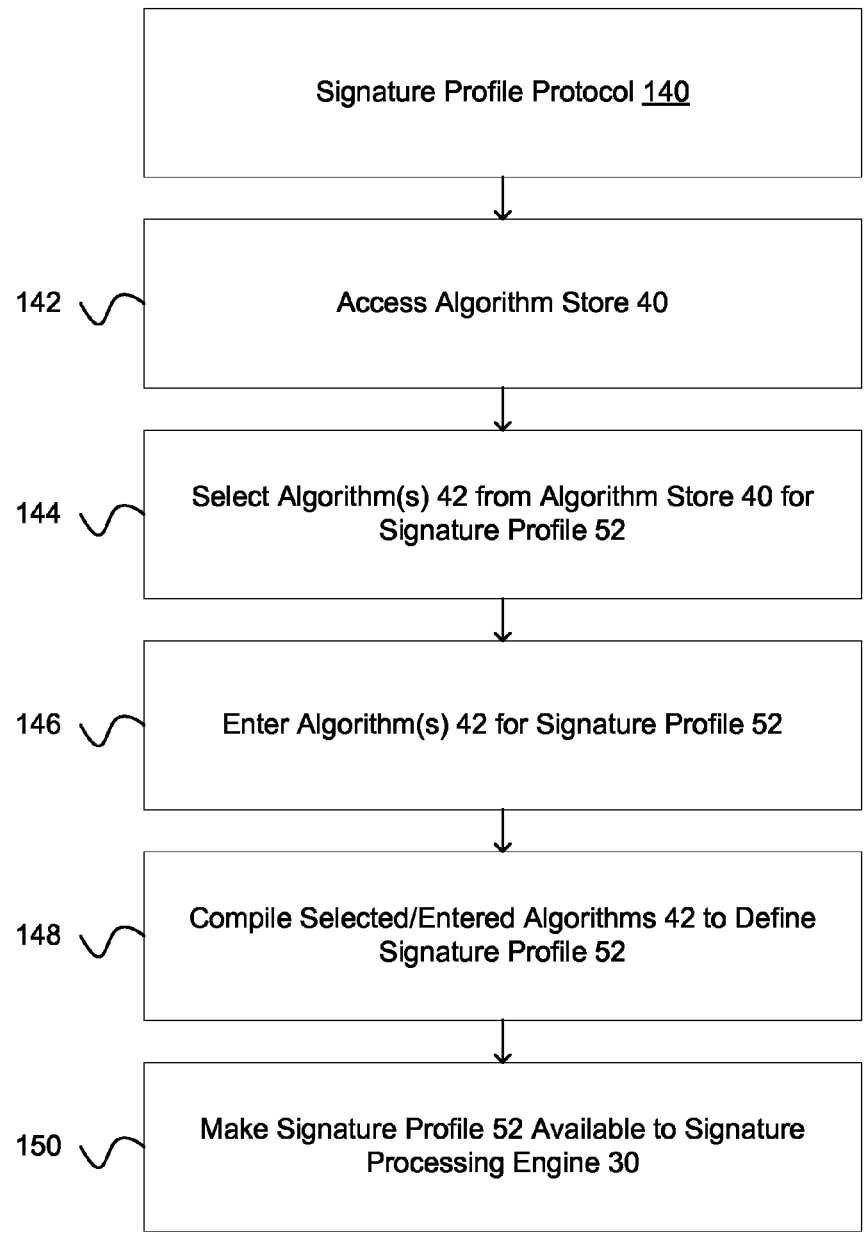
FIG. 4 is a flowchart of one embodiment of a signature profile protocol that may be used by the data processing system of FIG. 1.

The data processing protocol 110 of FIG. 3 uses a signature profile 52 or an algorithm set defined by one or more algorithms (e.g., in association with step 114). One embodiment of a signature profile protocol is illustrated in FIG. 4, is identified by reference numeral 140, and may be integrated in any appropriate manner by the data processing system 10 of FIG. 1. Generally, the signature profile protocol 140 may be used to define a signature profile 52 for the data processing system 10 of FIG. 1.

The signature profile protocol 140 may include accessing the algorithm store 40 (step 142). The algorithm store 40 again may include one or more algorithms 42 (e.g., FIG. 2D) of any appropriate type. In any case, each algorithm 42 will generate at least one value when executed and based upon one or more values provided by the data set 100.

One or more algorithms 42 may be selected from the algorithm store 44 (e.g., through user interface 12) for at least partially defining the desired signature profile 52 (step 144 of the signature profile protocol 140). One or more algorithms 42 for the desired signature profile 52 may be manually input through the user interface 12 (step 146). As noted, a signature profile 52 may be defined by one or more algorithms 42 from the algorithm store 40, by one or more algorithms 42 that are input through the user interface 12, or both. Therefore and for purposes of the signature profile protocol 140 of FIG. 4, at least one of step 144 and step 146 will be executed (possibly each of steps 144 and 146) for purposes of defining a signature profile 52.

Step 148 of the signature profile protocol 140 is directed to compiling the selected/entered algorithms 42 to define a signature profile 52. This signature profile 52 may be stored or retained in the signature profile store 50 (FIG. 1), for instance to alleviate the need for recreating the same on a subsequent occasion. In any case, the signature profile 52 associated with step 148 is made available or input to the signature processing engine 30. The signature profile 52 is used by the signature processing engine 30 to generate a plurality of signatures 190 from a data set 100 that is opened by the data processing module 20 (e.g., FIG. 1; step 138 of the data processing protocol 110 of FIG. 2).

Figure 5:
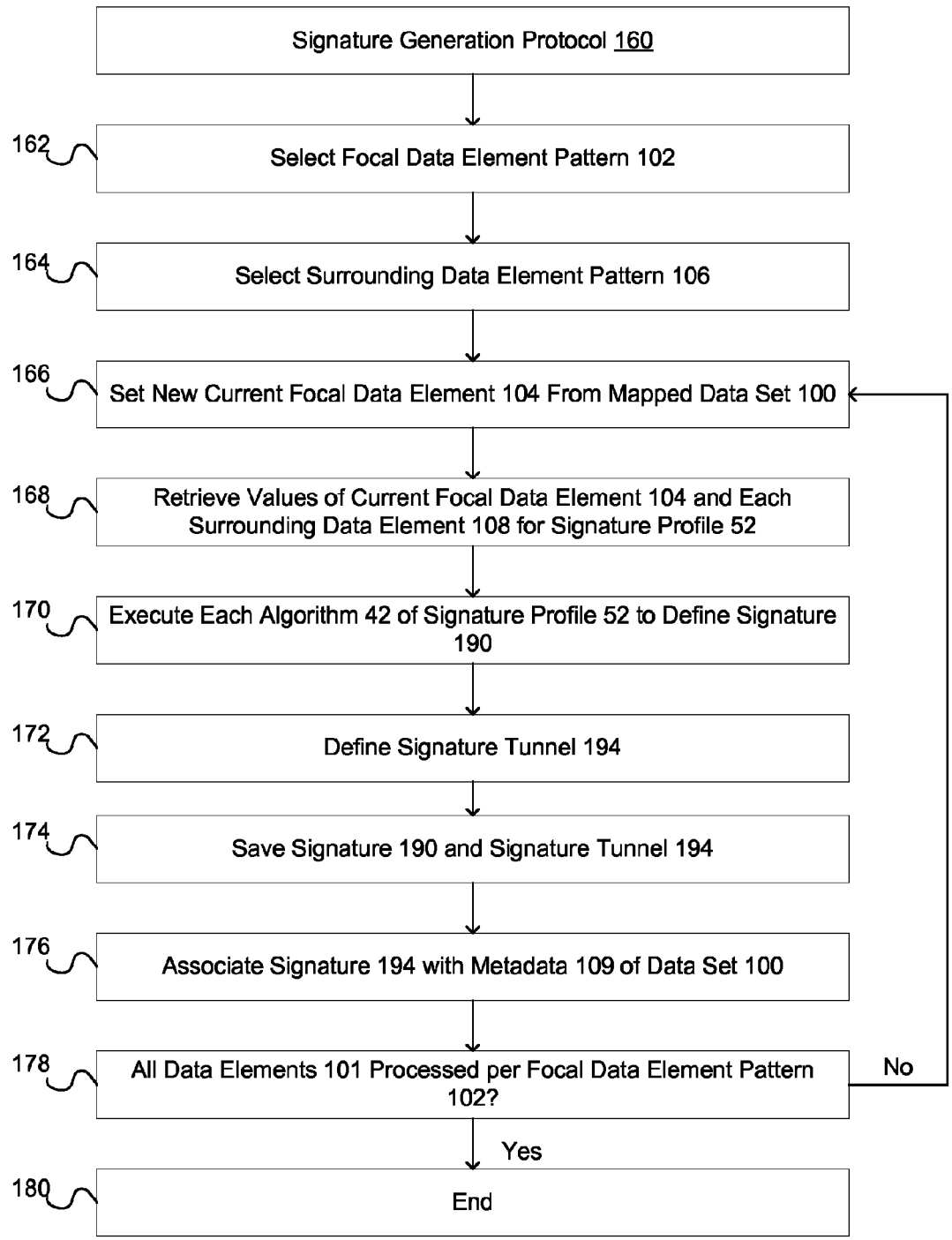
FIG. 5 is a flowchart of one embodiment of a signature generation protocol that may be used by the data processing system of FIG. 1.

The data processing protocol 110 of FIG. 3 generates signatures 190 (e.g., in association with step 138). Again, a signature 190 is associated with a particular data element 101 of the data set 100. One embodiment of a signature generation protocol is illustrated in FIG. 5, is identified by reference numeral 160, and may be integrated in any appropriate manner by the data processing system 10 of FIG. 1. The signature generation protocol 160 includes selecting what may be characterized as a "focal data element pattern 102" for processing the data set 100 that has been opened by the data processing system 10 (e.g., via user input through the user interface 12). A "focal data element" 104 is that particular data element 101 from the data set 100 whose signature 190 is currently being generated by the signature processing engine 30. The focal data element pattern 104 may be used to define which of the data elements 101 from the data set 100 are going to have a signature 190 generated by the signature processing engine 30. Each data element 101 of the data set 100 could be processed to define a corresponding signature 190. However, the data processing system 10 accommodates selecting less than the entirety of the data elements 101 from the data set 100 for generating signatures 190. The data set 100 could be parsed into a plurality of data segments each having a certain number of data elements 101, and each such data segment could include a single focal data element 104 (e.g., data set 100 could be parsed into 3×3 sections or collections of data elements 101, with the center data element 101 being the focal data element 104). The focal data element pattern 104 could be used to define how the data set 100 is to be parsed.

The signature generation protocol 160 of FIG. 5 further includes selecting what may be characterized as a "surrounding data element pattern 106" for processing the data set 100 (e.g., via user input through the user interface 12). A "surrounding data element 108" in relation to a signature 190 (which is again directed to a particular data element 101) are those data elements 101 of the data set 100 that are used to characterize a focal data element 104 by defining its signature 190. Stated another way, the surrounding data elements 108 are those data elements 101 of the data set 100 that have been selected to relationally describe a particular focal data element 104 via an associated signature profile 52. Values for a focal data element 104 and each surrounding data element 108 encompassed by the surrounding data element pattern 106 (step 164) are input to the algorithm(s) 42 that define the relevant signature profile 52. The execution of the signature profile 52 provides the signature value(s) 192 for the signature 190.

Step 166 of the signature generation protocol 160 is directed to setting a new current focal data element 104 from the formatted data set 100 (e.g., selecting the data element 101 from the data set 100 for which a signature 190 is to be generated). The values of this focal data element 104 and each surrounding data element 108 (specified by the surrounding data element pattern 106 of step 164) are retrieved for the signature profile 52 that is to be used to generate a signature 190 for the current focal data element 104 (step 168). In this regard, step 170 of the signature generation protocol 160 is directed to executing each algorithm 42 of the signature profile 52 to define a signature 190 for the current focal data element 104.

A signature tunnel 194 for the signature 190 could also be defined pursuant to the signature generation protocol 160 (step 172). Although signature tunnels 194 may be defined as signatures 190 are generated, they could also be defined at a later time. In any case, signature tunnels 194 again are discussed above in relation to FIGS. 2F and 2G. A signature tunnel 194 may be defined if the signature 190 is being added to the data store 60. A signature tunnel 194 need not be defined if the signature 190 being generated is being used to visualize data or if the signature 190 is being compared with the data store 60 (e.g., for feature identification or extraction purposes).

The signature 190 and any signature tunnel 194 may be saved in the case of the signature generation protocol 160 (step 174). The signature 190 and the associated tunnel 194 could be saved in the data store 60 of the data processing system 10. The metadata 109 for the data set 100 may be associated with a signature 190 that is being saved in the data store 60 in any appropriate manner (step 176). The signature 190 that is generated by step 170 could in fact be stored in any appropriate location (e.g., in cache) and for any appropriate purposes, such as for being compared with the data store 60 by the comparator 90.

Step 178 of the signature generation protocol is directed to determining if all data elements 101 of the data set 100 have been processed in accordance with the focal data element pattern 104 from step 162. If not, the signature generation protocol 160 proceeds back to step 166 for repetition in accordance with the foregoing. If all data elements 101 have been processed in accordance with the focal data element pattern 102 (step 162), the signature generation protocol 160 terminates and as set forth by step 180.

Figure 6:
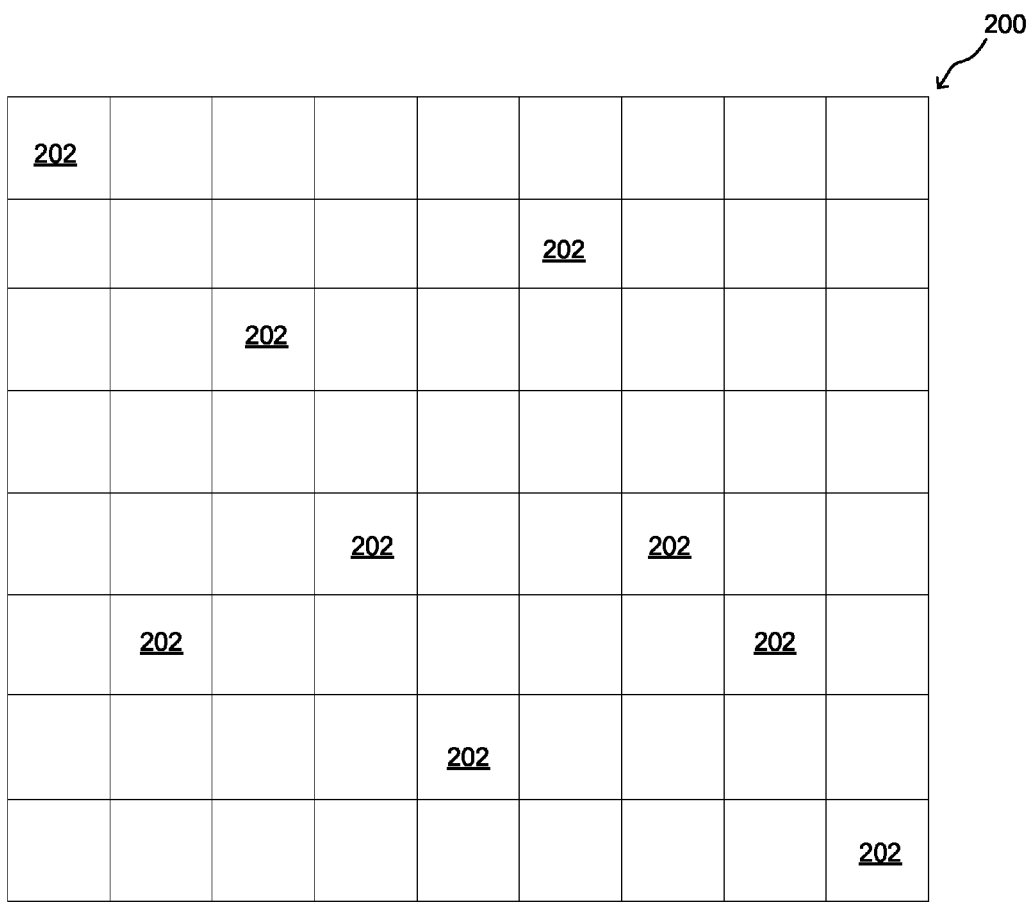
FIG. 6 is a schematic of one embodiment of a two-dimensional data set that may be opened by the data processing system of FIG. 1.

Signatures 190 may be generated from data of any appropriate format and type. Representative examples of data sets 100 that may be processed in accordance with the data processing protocol 110 (FIG. 3) and the signature generation protocol 160 (FIG. 5) will now be addressed. FIG. 6 is a schematic of a two-dimensional data set 200 (e.g., image data). The 2D data set 200 is defined by a plurality of data elements 202 (only some of the data elements 202 being specifically identified), which in the illustrated embodiment are arranged in a plurality of rows and columns. The 2D data set 200 may be defined by any number of rows and columns, or in any other appropriate manner.

Figure 6A:
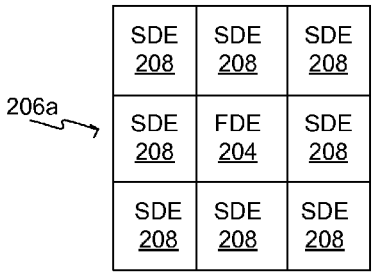
FIGS. 6A-6E are schematics of various embodiments of surrounding data element patterns that may be used by the data processing system of FIG. 1 to generate a signature from a two-dimensional data set.
Figure 6B:
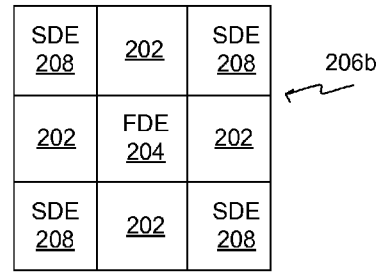
Figure 6C:
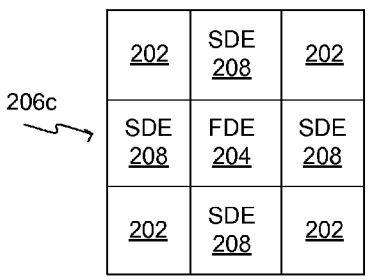
Figure 6D:
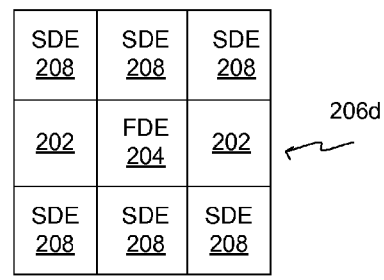
Figure 6E:
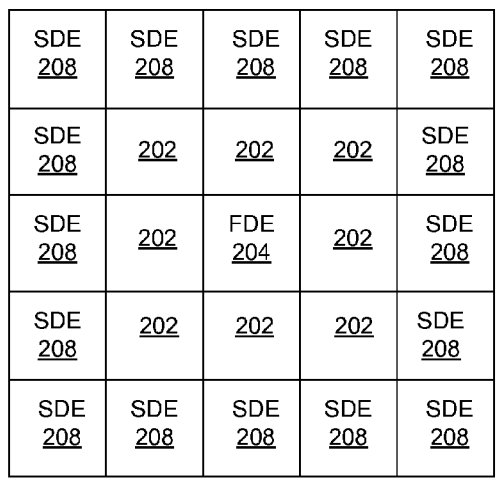

FIGS. 6A-6E present at least representative surrounding data element patterns 106 for purposes of step 164 of the signature generation protocol 160 of FIG. 5. FIGS. 6A-6D each show a 3×3 segment or selection of data elements 202 from the 2D data set 200 of FIG. 6. FIG. 6E shows a 5×5 segment or selection of data elements 202 from the 2D data set 200 of FIG. 6. A focal data element 204 is shown in each of FIGS. 6A-6E and is at the "center" of the illustrated segments. A plurality of surrounding data elements 208 is also shown in each of FIGS. 6A-6E and whose values are used as inputs to a signature profile 52 to define a signature 190 for the illustrated focal data element 204. However, it should be appreciated that a given focal data element 204 could be defined in relation to a single surrounding data element 208.

The surrounding data element pattern 206a of FIG. 6A shows the surrounding data elements 208 being in the form of each data element 202 of the 2D data set 200 that adjoins the focal data element 204 (e.g. the first "band" of data elements 202 that are disposed about the illustrated focal data element 204). The surrounding data element pattern 206b of FIG. 6B shows the surrounding data elements 208 being in the form of those data elements 202 of the 2D data set 200 that are at the four corners of the 3×3 segment shown in FIG. 6B. The surrounding data element pattern 206c of FIG. 6C shows the surrounding data elements 208 being in the form of those data elements 202 of the 2D data set 200 that are immediately above, below, and to the two sides of the focal data element 204 shown in FIG. 6C. The surrounding data element pattern 206d of FIG. 6D shows the surrounding data elements 208 being in the form of those data elements 202 of the 2D data set 200 that are in the rows immediately above and below the focal data element 204 in the 3×3 segment shown in FIG. 6D. Finally, the surrounding data element pattern 206e of FIG. 6E shows the surrounding data elements 208 being in the form of those data elements 202 of the 2D data set 200 that are in the "second band" about the focal data element 204 for the 5×5 segment shown in FIG. 6E (e.g., none of the data elements 202 that adjoin the focal data element 204 is a "surrounding data element 208" for purposes of defining a signature 190 for the focal data element 204 in accordance with surrounding data element pattern 206 shown in FIG. 6E; there is one data element 202 between each surrounding data element 208 and the focal data element 204).

Figure 7:
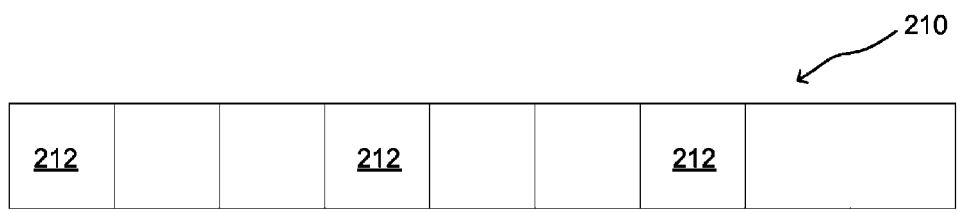
FIG. 7 is a schematic of one embodiment of a one-dimensional data set that may be opened by the data processing system of FIG. 1.

FIG. 7 is a schematic of a one-dimensional data set 210 (e.g., non-imagery data). The 1D data set 210 is defined by a plurality of data elements 212 (only some of the data elements 212 being specifically identified). Representative one-dimensional data for the 1D data set 210 includes without limitation financial data, log data, EMG data, and sound data.

Figure 7A:
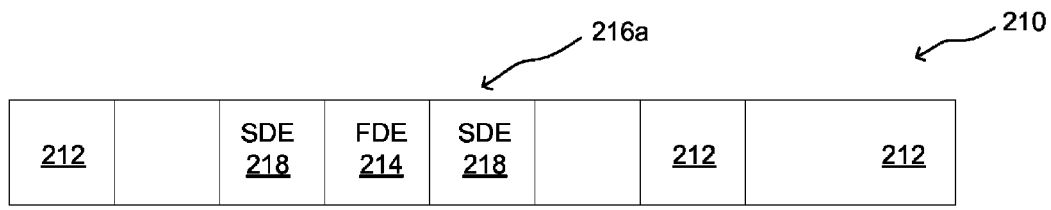
FIGS. 7A-7B are schematics of various embodiments of surrounding data element patterns that may be used by the data processing system of FIG. 1 to generate a signature from a one-dimensional data set.
Figure 7B:
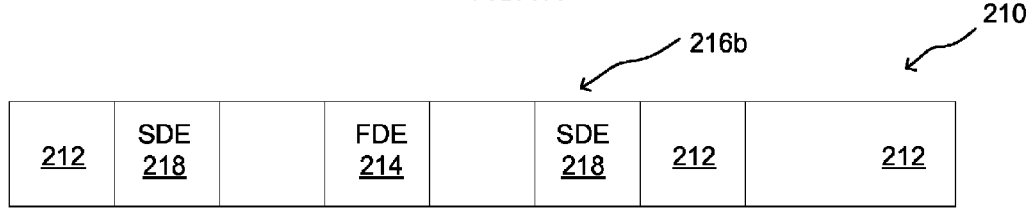

FIGS. 7A-7B present representative surrounding data element patterns 106 for purposes of step 164 of the signature generation protocol 160 of FIG. 5. A focal data element 214 is shown in each of FIGS. 7A-7B. A plurality of surrounding data elements 218 is also shown in each of FIGS. 7A-7AB and whose values are used as inputs to a signature profile 52 to define a signature 190 for the associated focal data element 214. However, it should be appreciated that a given focal data element 214 could be defined in relation to a single surrounding data element 218.

The surrounding data element pattern 216a of FIG. 7A shows the surrounding data elements 218 being in the form of each data element 212 of the 1D data set 210 that adjoins the focal data element 214 (e.g., the immediately leading and trailing data elements 212; the data element 212 on each "side" of the focal data element 214). The surrounding data element pattern 216b of FIG. 7B shows the surrounding data elements 218 being in the form of a data element 212 that is spaced one data element 212 from the focal data element 214 (e.g., each of the two surrounding data elements 218 shown in FIG. 7B is spaced one data element 218 from the focal data element 214 to define the surrounding data element pattern 216b).

Figure 8:
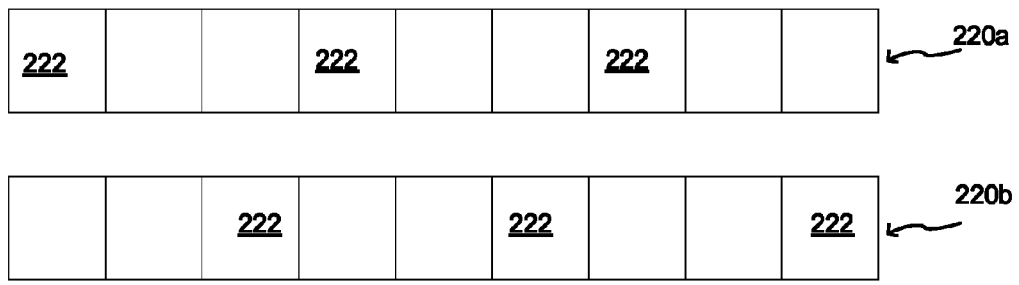
FIG. 8 is a schematic of a pair of one-dimensional data sets that may be opened by the data processing system of FIG. 1.

FIG. 8 is a block diagram of a pair of one-dimensional data sets 220a, 220b (e.g., non-imagery). Each 1D data set 220a, 220b is defined by a plurality of data elements 222 (only some of the data elements 222 being specifically identified). Although the same data types could be used by each 1D data set 220a, 220b, the 1D data set 220a could have data elements 222 of one data type (e.g., temperature values), while the 1D data set 220b could have data elements 222 of a different data type (e.g., pressure values). The representative one-dimensional data discussed above with regard to the 1D data set 210 of FIG. 7 is equally applicable to each the 1D data sets 220a, 220b of FIG. 8.

Figure 8A:
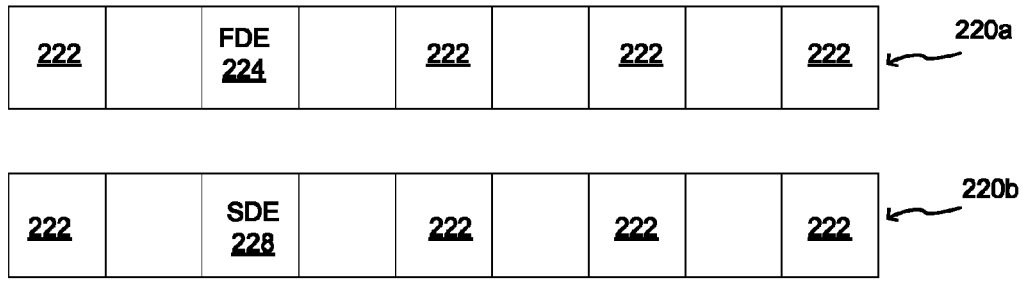
FIGS. 8A-8B are schematics of various embodiments of surrounding data element patterns that may be used by the data processing system of FIG. 1 to generate a signature from a pair of one-dimensional data sets.
Figure 8B:
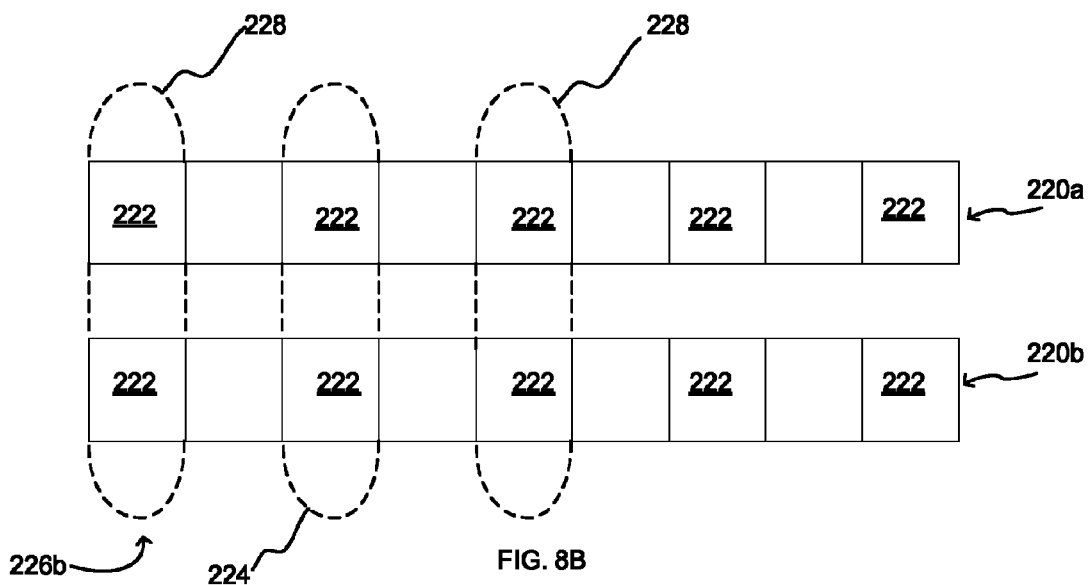

FIGS. 8A-8B present representative surrounding data element patterns 106 for purposes of step 164 of the signature generation protocol 160 of FIG. 5. A focal data element 224 is shown in each of FIGS. 8A-8B. A plurality of surrounding data elements 228 is also shown in each of FIGS. 8A-8B and whose values are used as inputs to a signature profile 52 to define a signature 190 for the associated focal data element 214. However, it should be appreciated that a given focal data element 224 could be defined in relation to a single surrounding data element 228.

The surrounding data element pattern 226a of FIG. 8A shows a single surrounding data element 228 being in the 1D data set 220b, with the focal data element 224 being in the other 1D data set 220a. Although the surrounding data element 228 and the focal data element 224 in FIG. 8A may appear to be "registered" in at least some respect (e.g. data readings associated with a common parameter, such as time), such need not be the case in all instances.

The focal data element 224 in FIG. 8B is actually in the form of one data element 222 from the 1D data set 220a and one data element 222 from the 1D data set 220b. The surrounding data element pattern 226b of FIG. 8B is similarly defined. That is, a pair of data elements 222 from each of the 1D data sets 220a, 220b defines one surrounding data element 228, while another pair of data elements 222 from each of the 1D data sets 220a, 220b defines another surrounding data element 228. Although the data element 222 in the 1D data set 220a and the data element 222 in the 1D data set 220b that define each of the focal data element 224 and the two surrounding data elements 228 may appear to be "registered" in at least some respect for the focal data element pattern 226b of FIG. 8B (e.g. data readings associated with a common parameter, such as time), such need not be the case in all instances.

Figure 9A:
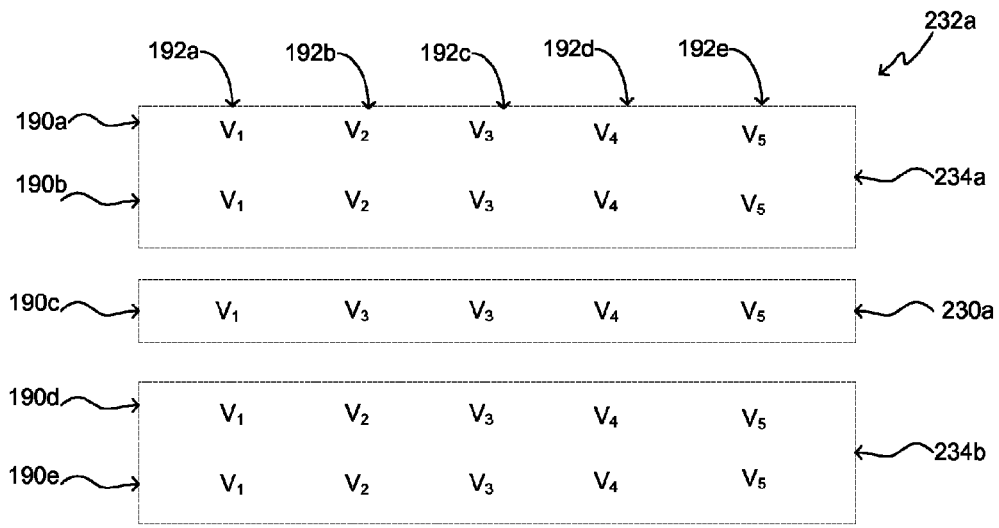
FIG. 9A is a schematic illustrating one embodiment of a surrounding data element pattern that may be used by the data processing system of FIG. 1 to generate a signature from a data set in the form of multiple signatures.
Figure 9B:
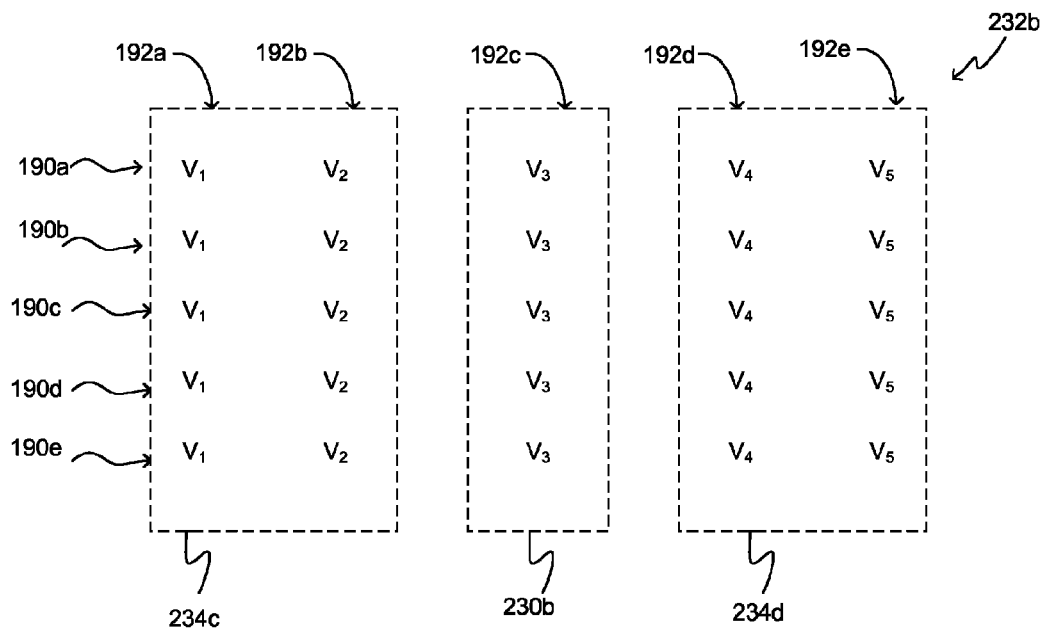
FIG. 9B is a schematic illustrating another embodiment of a surrounding data element pattern that may be used by the data processing system of FIG. 1 to generate a signature from a data set in the form of multiple signatures.

FIGS. 9A-9B present representative surrounding data element patterns 106 for purposes of step 164 of the signature generation protocol 160 of FIG. 5, namely for when the data set 100 is in the form of a plurality of signatures 190 provided by the signature processing engine 30 (e.g., transmitted from the signature processing engine 30 to the data extractor 22 via the signature feedback communication link 36 in the data processing system 10 of FIG. 1).

Each of FIGS. 9A and 9B present a data set 100 in the form of five signatures 190a-190e. Each of the signatures 190a-e is defined by five signature values 192a-192e. In FIG. 9A, the focal data element 230a is in the form of the signature 190c. A pair of surrounding data elements 234a, 234b is also shown in FIG. 9A and whose values are used as inputs to a signature profile 52 to define a signature 190 for the associated focal data element 230a. One of the surrounding data elements 234a for the surrounding data element pattern 232a of FIG. 9A is defined by signatures 190a and 190b. The other of the surrounding data elements 234b for the surrounding data element pattern 232a of FIG. 9A is defined by signatures 190d and 190e. Although the five signature values 192a-e for the five signatures 190a-e may appear to be "registered" in at least some respect for the focal data element pattern 232a of FIG. 9A (e.g. data readings associated with a common parameter, such as time), such need not be the case in all instances.

In FIG. 9B, the focal data element 230b is in the form of the signature values 192c from each of the five signatures 190a-e. A pair of surrounding data elements 234c, 234d is also shown in FIG. 9B and whose values are used as inputs to a signature profile 52 to define a signature 190 for the associated focal data element 230b. One of the surrounding data elements 234c for the surrounding data element pattern 234b of FIG. 9B is defined by the signature values 192a and 192b from each of the five signatures 190a-e. The other of the surrounding data elements 234c for the surrounding data element pattern 234b of FIG. 9B is defined by the signature values 192d and 192e from each of the five signatures 190a-e. Although the five signature values 192c that define the focal data element 230b, the five signature values 192a and the five signature values 192b that define the surrounding data element 234c, and the five signature values 192d and the five signature values 192e that define the two surrounding data element 234d may appear to be "registered" in at least some respect for the focal data element pattern 232b of FIG. 9B (e.g. data readings associated with a common parameter, such as time), such need not be the case in all instances.

The foregoing addresses how signatures 190 may be generated by the data processing system 10 of FIG. 1. Again, a signature 190 is a representation of a single data element 101 in a data set 100 in relation to at least one other data element 101 of the same data set 100. Signatures 190 may be used by the data processing system 10 for a variety of applications. One such application for signatures 190 is to use the same to identify one or more features in a data 100. Generally, signatures 190 that are generated by from a data set 100 may be compared with the data store 60 of the data processing system 10 of FIG. 1 to identify one or more features in the data set 100.

The data store 60 that may be used by data processing system 10 of FIG. 1 may be characterized as a knowledge base. Generally, one or more previously defined signatures 190 may be input to the data store 60 in at least some fashion to provide a comparative data set of sorts for signatures 190 that are subsequently generated by the data processing system 10 (e.g., from a different data set 100). Data regarding these signatures 190 may be stored in any appropriate manner with the data store 60 to facilitate comparison with subsequently-generated signatures 190.

Generally, the data store 60 may be viewed as one or more collections of signatures 190. The data processing system 10 of FIG. 1 could include a single data store 60 with one or more collections of signatures 190. The data processing system 10 of FIG. 1 could also include a separate data store 60 for each collection of signatures 190. In any case, each collection of signatures 190 may be defined by a common signature profile 52 or algorithm set. Hereafter, the data store 60 will be described with regard to one of these collections of signatures 190.

Figure 10:
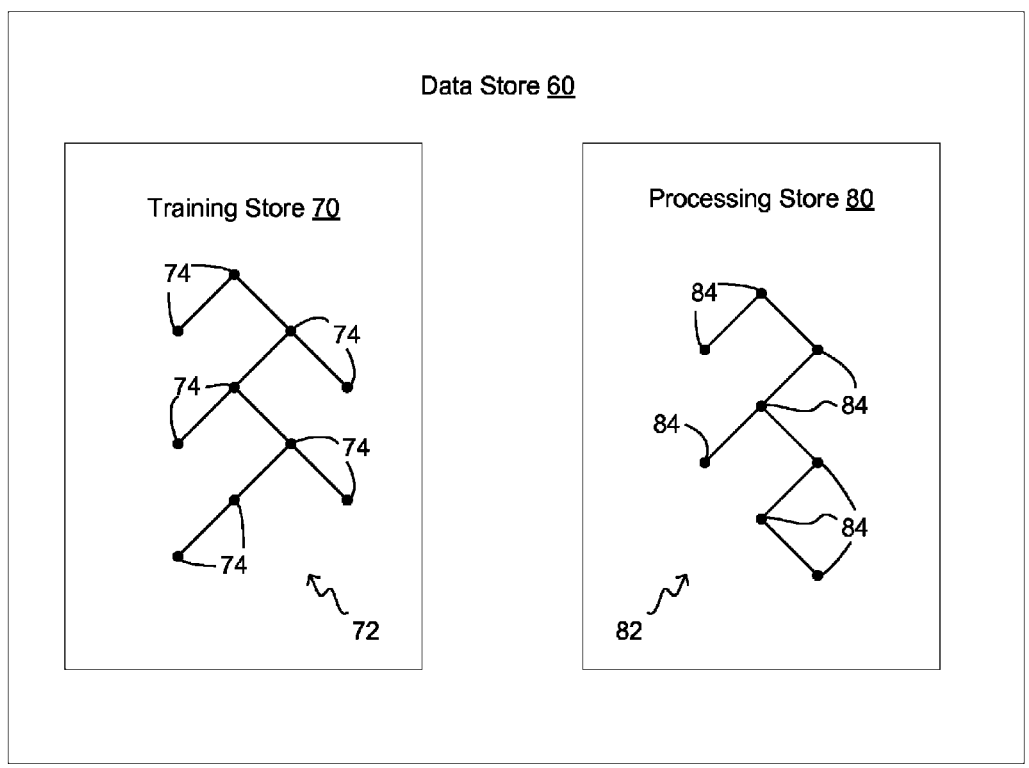
FIG. 10 is a schematic of one embodiment of a data store that may be used by the data processing system of FIG. 1.

One possible configuration for the data store 60 from the data processing system 10 of FIG. 1 is shown in FIG. 10. The data store 60 again may include a training store 70 and a separate processing store 80. The training store 70 may utilize a binary tree 72, while the processing store 80 may utilize a binary tree 82. The training store 70 may be viewed as a collection of signatures 190 (e.g., the signature values 192 representative of the signatures 190), while the processing store 80 may be viewed as a collection of intervals that correspond with at least part of the signature tunnels 194 of the various signatures 190. More specifically, each node 74 of the training store binary tree 72 may be a value that is representative of a particular signature 190. Moreover, each node 84 of the processing store binary tree 82 may be a range of values that is representative of at least part of signature tunnel 194 for one or more signatures 190, and/or may be representative of a range of overlapping values with regard to the signature tunnel 194 of multiple signatures 190. Newly generated signatures 190 could be compared with either the training store 70 or the processing store 80. Comparisons of signatures 190 with the training store 70 may provide an enhanced degree of specificity, while comparisons of signatures 190 with the processing store may provide an enhanced degree of generalization.

Each node 74 of the training store 70 and each node 84 of the processing store 84 may include a label. One embodiment of such a label is illustrated in FIG. 11 and is identified by reference numeral 270. Generally, each label 270 includes all signatures 190 associated with the corresponding nodes 74, 84 of the training and processing binary trees 72, 82, respectively. Each such label 270 may also include the metadata 109 associated with each signature 190, along with a feature ID 272. The feature ID 272 identifies what the corresponding signature 190 is representative of (e.g., tree, water). Any number of signatures 190 may be associated with a given label 270 (e.g., one or more).

Figure 12:
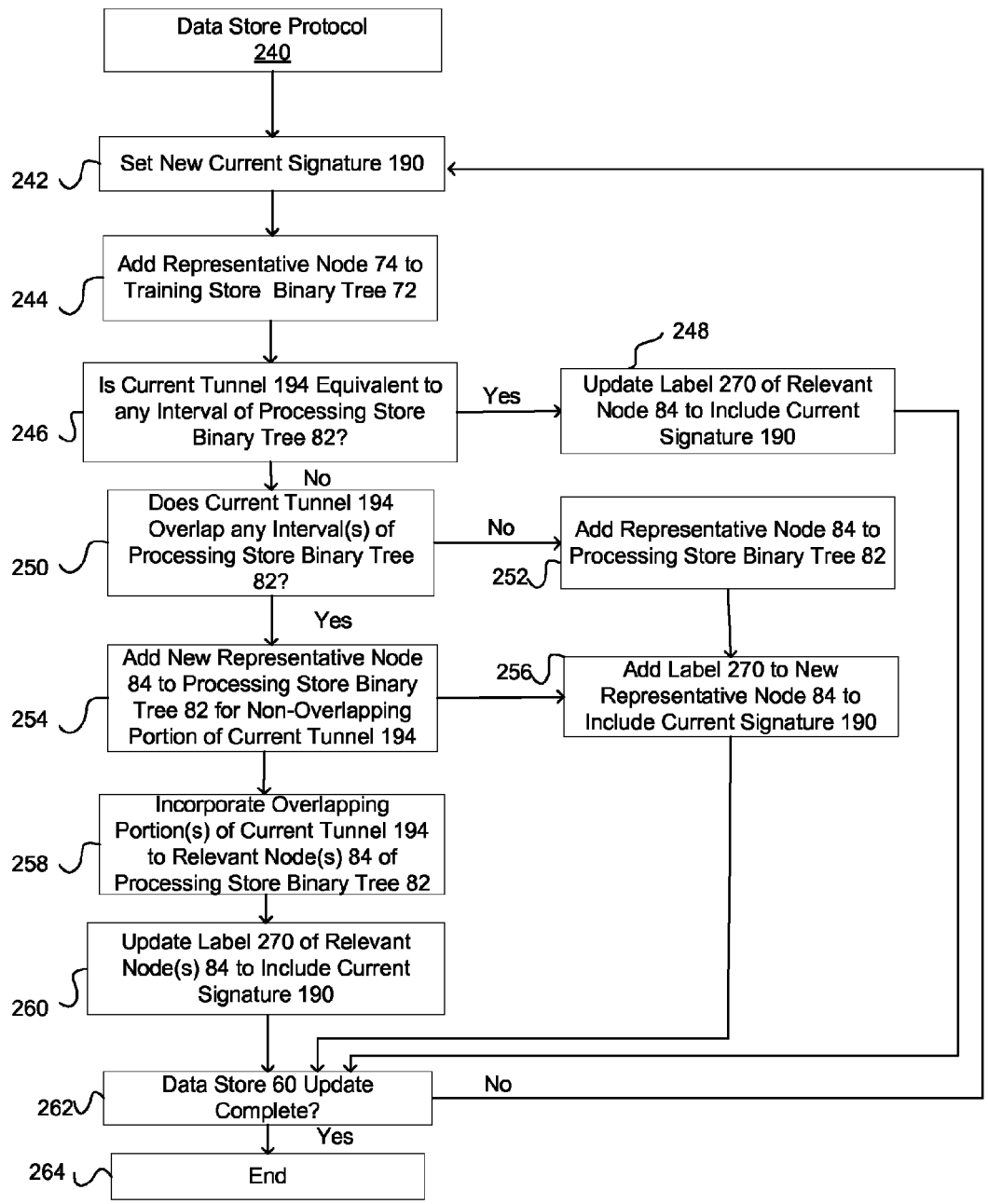
FIG. 12 is a flowchart of one embodiment of a data store protocol that may be used by the data processing system of FIG. 1.

The above-described training store binary tree 72 and the processing store binary tree 82 for the data store 60 may be developed or populated in tandem. One embodiment of protocol that may be used to develop or populate the training store binary tree 72 and the processing store binary tree 82 in this manner is shown in FIG. 12. The data store protocol 240 of FIG. 12 may be integrated in any appropriate manner by the data processing system 10 of FIG. 1.

Step 242 of the data store protocol 240 is directed to setting a new current signature 190 to be incorporated into the data store 60 (e.g., "current" being used in the sense that it identifies the signature 190 that is currently being incorporated by the data store 60—tunnel 194 associated with this signature thereby also being referred to as the "current tunnel 194" in the data store protocol 240). A representative node 74 is added to the training store binary tree 72 (step 244)—"representative" meaning that the node 74 has a value(s) associated with the value(s) of the current signature 190.

Once a node 74 has been added to the training store binary tree 72, the current tunnel 194 for the current signature 190 is incorporated into the processing store binary tree 82. The data store protocol 24 illustrates three possible scenarios as to how this may be done, and these scenarios may be addressed in any appropriate order by the protocol 240. The three scenarios are: the current tunnel 194 may be equivalent to an interval associated with one or more nodes 84 of the processing store binary tree 82; the current tunnel 194 may overlap with an interval associated with one or more nodes 84 of the processing store binary tree 82; or the current tunnel 194 may be completely outside of the interval associated with each node 84 currently defined for the processing store binary tree 82.

Step 246 of the data store protocol 240 is directed to determining if the current tunnel 194 is equivalent to any interval associated with any node 84 of the processing store binary tree 82. If so, the data store protocol 240 proceeds to step 248 where the label 270 of this particular node 84 (having an interval that encompasses the current tunnel 194) is updated to include the current signature 190 (see FIG. 11 regarding content for the label 270). Thereafter, the data store protocol 240 may proceed to step 262 and which is directed to making a determination as to whether the data store 60 update has been completed (e.g., whether all signatures 190 from a selected portion of a particular data set 100 have been incorporated by the data store 60).

Step 250 of the data store protocol 240 is directed to determining if the current tunnel 194 overlaps with an interval associated with any node 84 of the processing store binary tree 82. If not, the data store protocol 240 proceeds to step 252, where a new representative node 84 is added to the processing store binary tree 82 (for the illustrated configuration of the data store protocol 240, if the current tunnel 194 is not a subset of any interval of the processing store binary tree 82, and it also does not partially overlap with any interval of the processing store binary tree 82, it will then define a completely new interval for the processing store binary tree 82). The value for the interval for this new node 84 corresponds with value of the current tunnel 194. A label 270 for this new node 84 is also added through step 256, and that will include the current signature 190. Thereafter, the data store protocol 240 may proceed to step 262 (again, directed to determining whether all signatures 190 from a selected portion of a particular data set 100 have been incorporated by the data store 60).

If a determination has been made by the data store protocol 240 that the current tunnel 194 is not equivalent to an interval of any node 84 of the processing store binary tree 82 (step 246) and that this current tunnel 194 does overlap with an interval of at least one node 84 of the processing store binary tree 82 (step 250), one node 84 may be added to the data store processing tree 82 and at least one existing node 84 may be updated. Step 254 of the protocol 240 is directed to adding a new node 84 to the processing store binary tree 82 for the non-overlapping portion of the current tunnel 194 (i.e. the portion of the current tunnel 194 that does not overlap with the interval of any node 84 currently in the processing store binary tree 82). A label 270 (see FIG. 11) for this new node 84 may be added through step 256, and that will include the current signature 190. Step 258 of the data store protocol 240 address the overlapping portion of the current tunnel 194. Step 258 is more specifically directed to incorporating the overlapping portion(s) of the current tunnel 194 with the relevant nodes(s) 84 of the processing store binary tree 82. Moreover, the label 270 for each such node 84 may be updated to include the current signature 190 (step 260).

At step 262 of the data store protocol 240, a determination is made as to whether the updating of the data store 60 has been completed—namely a determination as to whether all of the desired signatures 190 been incorporated by the data store 60. If not, the protocol 240 returns to step 242 for a repetition in accordance with the foregoing. If the update of the data store 60 is complete, the data store protocol 240 may be terminated through step 264.

An example in accordance with the data store protocol 240 of FIG. 12 is presented in FIGS. 13A-16B. Four signatures 190 ($S_1$, $S_2$, $S_3$, and $S_4$) are incorporated by the data store 60 for the example presented by FIGS. 13A-16B. Signature $S_1$ has a signature value (e.g., signature value 192) of "4" and tunnel value limits (e.g., upper signature tunnel limit 196a and lower signature tunnel limit 196b) or an interval of (2, 6) (e.g., a range that encompasses the value(s) of the signature $S_1$). Signature $S_2$ has a signature value of "7" and tunnel value limits or an interval of (5, 9). Signature $S_3$ has a signature value of "12" and tunnel value limits or an interval of (10, 14).

Finally, signature $S_4$ has a signature value of "6" and tunnel value limits or an interval of (4, 8).

Figure 13A:
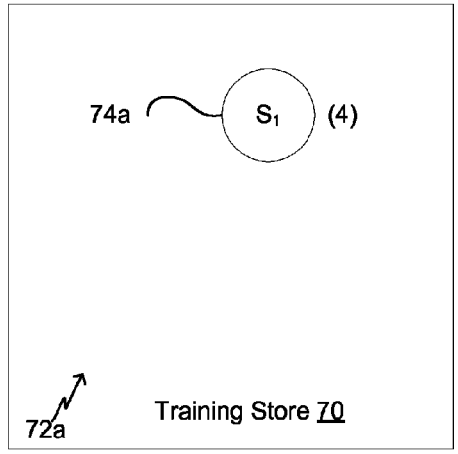
FIGS. 13A/B, 14A/B, 15A/B, and 16A/B present sequential views for building one embodiment of a binary tree for the training and processing stores of the data store used by the data processing system of FIG. 1.
Figure 13B:
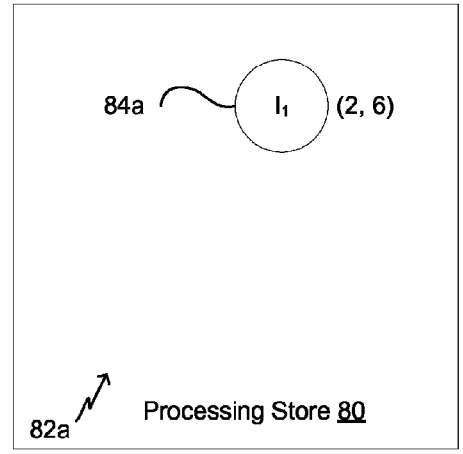

FIGS. 13A-13B are directed to adding the signature $S_1$ to the training store 70 (e.g., signature value(s) 192) and adding the tunnel for the signature $S_1$ to the processing store 80 (e.g., its signature tunnel 194; its upper signature tunnel limit 196a and lower signature tunnel limit 196b), respectively. Node 74a (value=4) is added to the training store 70 for the signature $S_1$ and becomes the current root for the training store binary tree 72a. Node 84a (with values of (2, 6)) is added to the processing store 80 for the tunnel or interval of signature $S_1$ (identified as interval #1 or $I_1$ in FIG. 13B) and becomes the current root for the processing store binary tree 82a. A label 270 (FIG. 11) may be associated with the node 74a in the training store 70, and another label 270 may be associated with the node 84a in the processing store 80.

Figure 14A:
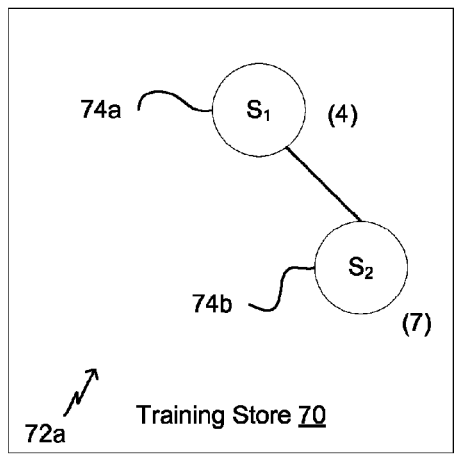
Figure 14B:
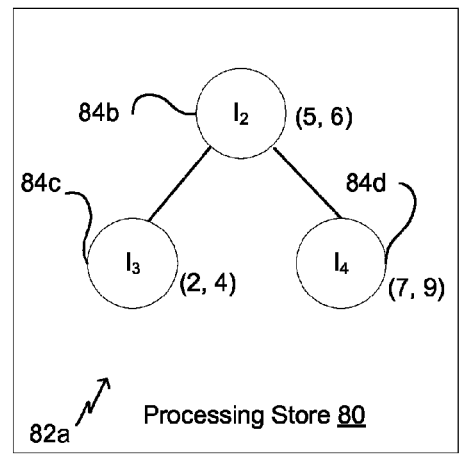

FIGS. 14A-14B are directed to adding the signature $S_2$ to the training store 70 and adding the tunnel or interval for the signature $S_2$ to the processing store 80, respectively. Node 74b (value=7) is added to the training store processing tree 72a. Since the value of signature $S_2$ (7) is greater than the value of the signature $S_1$ (4), node 74b is added to the right of node 74a in FIG. 14A for the training store binary tree 72a. A label 270 (FIG. 11) may be associated with the node 74b in the training store 70.

Regarding updating the processing store 80 in relation to the signature $S_2$, the interval for signature $S_2$ again is (5, 9), whereas the interval for signature $S_1$ again is (2, 6). These intervals partially overlap. The result of adding the interval (5, 9) for signature $S_2$ to the processing store binary tree 82a is shown in FIG. 14B. Node 84a (FIG. 13B) has been replaced with nodes 84b, 84c, and 84d, with node 84b now becoming the root for the processing store binary tree 82a and as shown in FIG. 14B. Node 84b is the overlapping portion of the interval for signatures $S_1$ and $S_2$ (this overlap being the interval $I_2$ having the values (5, 6)). Node 84c is the non-overlapping portion of the interval of signature $S_1$ (this non-overlapping portion being the interval $I_3$ having the values (2, 4)) in relation to signature $S_2$. Since this interval (2, 4) is smaller than the interval for node 84b (5, 6), node 84c is added to the left of node 84b and has an assigned value of (2, 4). Node 84d is the non-overlapping portion of the interval of signature $S_2$ (this non-overlapping portion being the interval $I_4$ and having the values of (7, 9)) in relation to signature $S_1$. Since this interval (7, 9) is larger than the interval for node 84b (5, 6), node 84d is added to the right of node 84b. A separate label 270 (FIG. 11) may be associated with each of the nodes 84b, 84c, and 84d in the processing store 80.

Figure 15A:
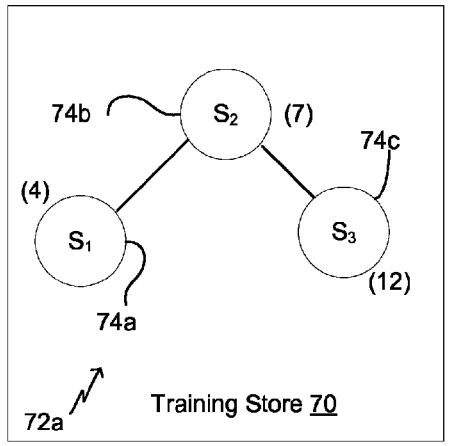
Figure 15B:
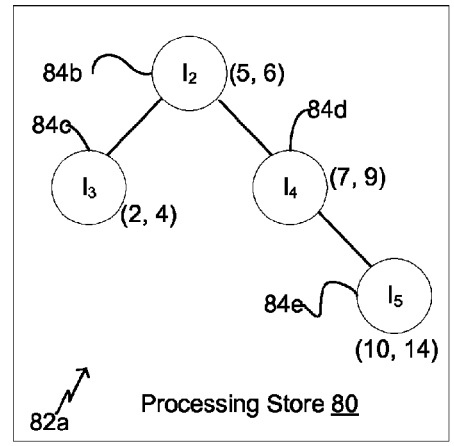

FIGS. 15A-15B are directed to adding the signature $S_3$ to the training store 70 and the tunnel or interval for signature $S_3$ to the processing store 80, respectively. Node 74c (value=12) is added to the training store processing tree 72a in the manner shown in FIG. 15A. The training store binary tree 72a may be updated so that its root is now node 74b of signature $S_2$. Since the value of signature $S_1$ (4) is less than the value of the signature $S_2$ (7), node 74a may be moved to the left of node 74b for the training store binary tree 72a. Since the value of signature $S_3$ (12) is greater than the value of the signature $S_2$ (7), node 74c may be added to the right of node 74b for the training store binary tree 72a. A label 270 (FIG. 11) may be associated with the node 74c in the training store 70.

Regarding updating the processing store 80 in relation to the signature $S_3$, the interval for the signature $S_3$ again is (10, 14). The interval $I_3$ is (2, 4), the interval $I_2$ is (5, 6), and the interval $I_4$ is (7, 9) for the processing store binary tree 82a from FIG. 14B. The interval for signature $S_3$ is (10, 14), and therefore does not overlap with the interval of any of the nodes 84b, 84c, or 84d in the processing store binary tree 82a of FIG. 14B. An entirely new node may then be added to the processing store binary tree 82a. In this regard and as shown in FIG. 15B, an interval $I_5$ is added to the processing store binary tree 82a in relation to the interval for signature $S_3$ (10, 14). Since the interval for signature $S_3$ (10, 14) is larger than the interval of node 84d (7, 9), new node 84e is added to the right of node 84d and is representative of the tunnel for signature $S_3$ (an interval $I_5$ having values of 10, 14)). A label 270 (FIG. 11) may be associated with the node 84e in the processing store 80.

Figure 16A:
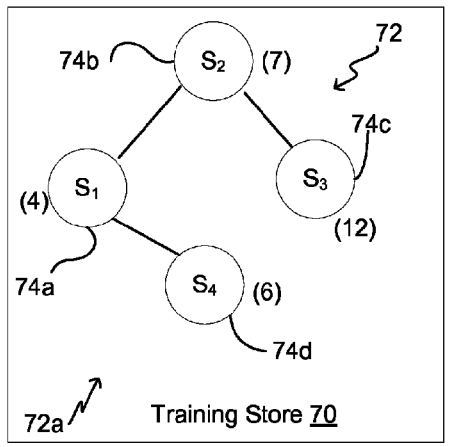
Figure 16B:
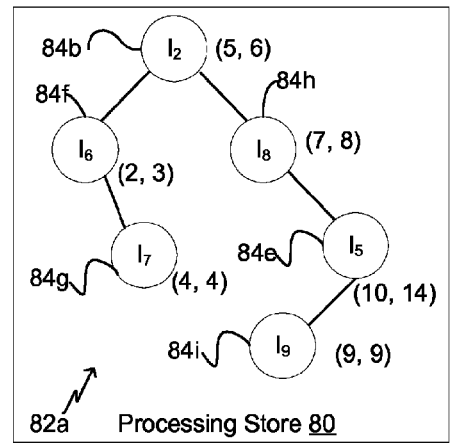

FIGS. 16A-16B are directed to adding the signature $S_4$ to the training store 70 and the tunnel or interval for the signature $S_4$ to the processing store 80, respectively. The value of the signature $S_4$ is "6." The value of the signature $S_4$ (6) is less than the value of the root signature $S_2$ (7) of the binary tree 72a shown in FIG. 15A, so the analysis proceeds to the left of node 74b to node 74a. The value of the signature $S_4$ (6) is greater than the value of the signature $S_1$ (4) at node 74a of the binary tree 72a in FIG. 15A, so the node 74d for signature $S_4$ is added to the right of node 74a for the training store binary tree 72a shown in FIG. 16A. A label 270 (FIG. 11) may be associated with the node 74d in the training store 70.

The interval for signature $S_4$ again is (4, 8). The interval $I_2$ for the root of the processing store binary tree 82a (node 84b shown in FIG. 15B) is (5, 6). As such, these intervals partially overlap. Part of the interval for signature $S_4$ (namely, the part having a value of (4, 4)) is less than the interval for the node 84b (5, 6), so the interval of node 84c (2, 4) (via proceeding down the left side of the processing store binary tree 82a in FIG. 15B from node 84b to node 84c) is compared to the smaller, non-overlapping portion of the interval for signature $S_4$ (4, 4). Part of the smaller, non-overlapping portion of the signature $S_4$ (4, 4) also overlaps with the interval of node 84c (2, 4), so node 84c of the processing store binary tree 82a shown in FIG. 15B is replaced with node 84f having an interval $I_6$ with values of (2, 3), and node 84g having an interval $I_7$ with values of (4, 4). Since the interval $I_7$ is greater than the interval $I_6$, node 84g is added to the right of node 84f for the processing store binary tree 82a shown in FIG. 16B. A label 270 (FIG. 11) may be associated with the node 84f and a label 270 (FIG. 11) may be associated with the node 82g in the processing store 80.

The larger, non-overlapping portion for signature $S_4$ (7, 8) is greater than the interval for the node 84b (5, 6) or the current root of the processing store binary tree 82a, so the analysis proceeds down the right side of the processing store binary tree 82a shown in FIG. 15B. The interval $I_4$ of node 84d (7, 9) to the right of node 84b in the processing store binary tree 82a of FIG. 15B is then compared to the larger, non-overlapping portion for signature $S_4$ (7, 8). The larger, non-overlapping portion for signature $S_4$ (7, 8) is totally encompassed by the interval $I_4$ of node 84d, so node 84d is placed with node 84h having an interval $I_8$ with values of (7,8) for the processing store binary tree 82a shown in FIG. 16B. The label 270 (FIG. 11) previously associated with the node 84d may then be updated for the replacement node 84h in the processing store 80.

The remaining interval (9, 9) from node 84d still needs to be added to the processing store binary tree 82a. Continuing to proceed down the right side of the processing store binary tree 82a to node 84e, its interval $I_5$ (10, 14) is larger than this remainder from node 84d (9, 9), so a new node 84i is added to the left of node 84e for the process store binary tree 82a and as shown in FIG. 16B, and with an interval $I_9$ having values of (9, 9). A label 270 (FIG. 11) may be associated with the node 84e in the processing store 80.

Each of the various nodes 74 in the training store 70 and the various nodes 84 in the processing store 80 again have an associated label 270 (FIG. 11). Each label 270 identifies all of the associated signatures 190 (i.e., multiple signatures 190 may be associated with a given node 74/84 in the processing store 60). Each signature 190 also has an associated feature ID 272. It should be appreciated that a given label 270 could store a single instance of a feature ID 272 in relation to one or more signatures 190 that are associated with the given label 270. In any case, the feature ID 272 again conveys an identity of the feature associated with the signature 190. Associating a signature 190 with a particular feature may be characterized as "training."

Figure 17:
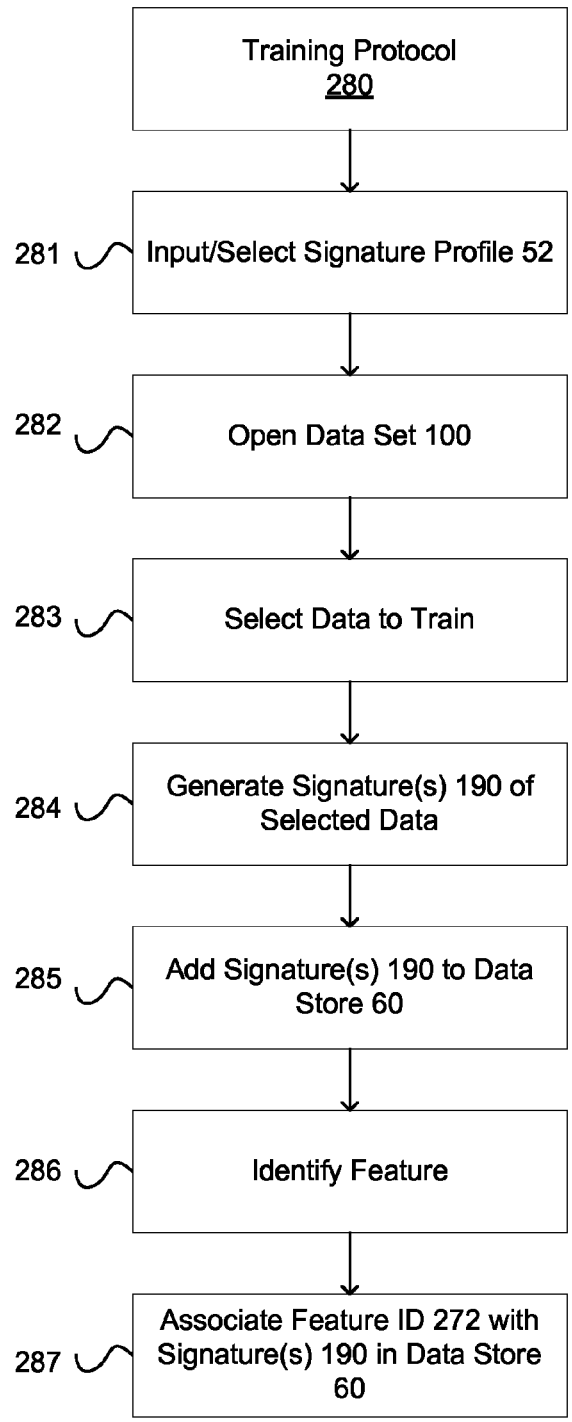
FIG. 17 is a flowchart of one embodiment of the training protocol that may be used by the data processing system of FIG. 1.

One embodiment of a training protocol is illustrated in FIG. 17, is identified by reference numeral 280, and may be integrated in any appropriate manner by the data processing system 10 of FIG. 1. A signature profile 52 (e.g., an algorithm set) is input or selected in accordance with step 281. The signature profile 52 may be used to select an appropriate data store 60 (e.g., a data store 60 having signatures 190 to find by the same signature profile 52). FIG. 4 that was discussed above again is directed to a signature profile protocol 140 that may be used to define such a signature profile 52. In any case, a data set 100 is opened for processing by the data processing system 10 (step 282). At least a portion of the data within the data set 100 may be selected for training (step 283). That is, one or more discrete areas or regions of the data set 100 may be trained. It is not required that training be conducted in relation to the entirety of a data set 100, although this may be done if desired/required for a particular application.

One or more signatures 190 are generated on the selected data (step 284 of the training protocol 280 of FIG. 17). FIG. 5 that was discussed above again is directed to a signature generation protocol 160 that may be used to generate signatures 190. The generated signatures 190 may then be added to the data store 60 (step 285 of the training protocol 280 of FIG. 17). FIG. 12 that was discussed above again is directed to a data store protocol 240 that may be used to populate the data store 60 (e.g., to define a training store binary tree 72 in tandem with a processing store binary tree 82). An example for populating the training store 70 and the processing store 80 with four signatures 190 is also discussed above and presented in FIGS. 13A-16B.

The feature(s) to which the selected data is directed is identified (step 286 of the training protocol 280 of FIG. 17). This may entail the use of a subject matter expert. It may be such that a signature 190 from the data set 100 is associated with a single feature from the data set 100. In any case, the feature ID 272 for the identified feature is associated with the relevant signature 190 in the data store 60 (step 287 of the training protocol 280 of FIG. 17). This again may be done by making an association between a given signature 190 and a particular feature ID 272 in the label 270 of one or more nodes 74 of the training store 70 and one or more nodes 84 of the processing store 80.

At least some of the discussion thus far presented may be characterized as "configuring" or "initializing" the data processing system of FIG. 1 so as to thereafter be able to provide one or more functions. One function that may be provided by the data processing system 10 is feature recognition or extraction—opening a data set 100 and identifying one or more features that exist within the data set 100 based upon signatures 190 within the knowledge base data store 60.

Figure 18:
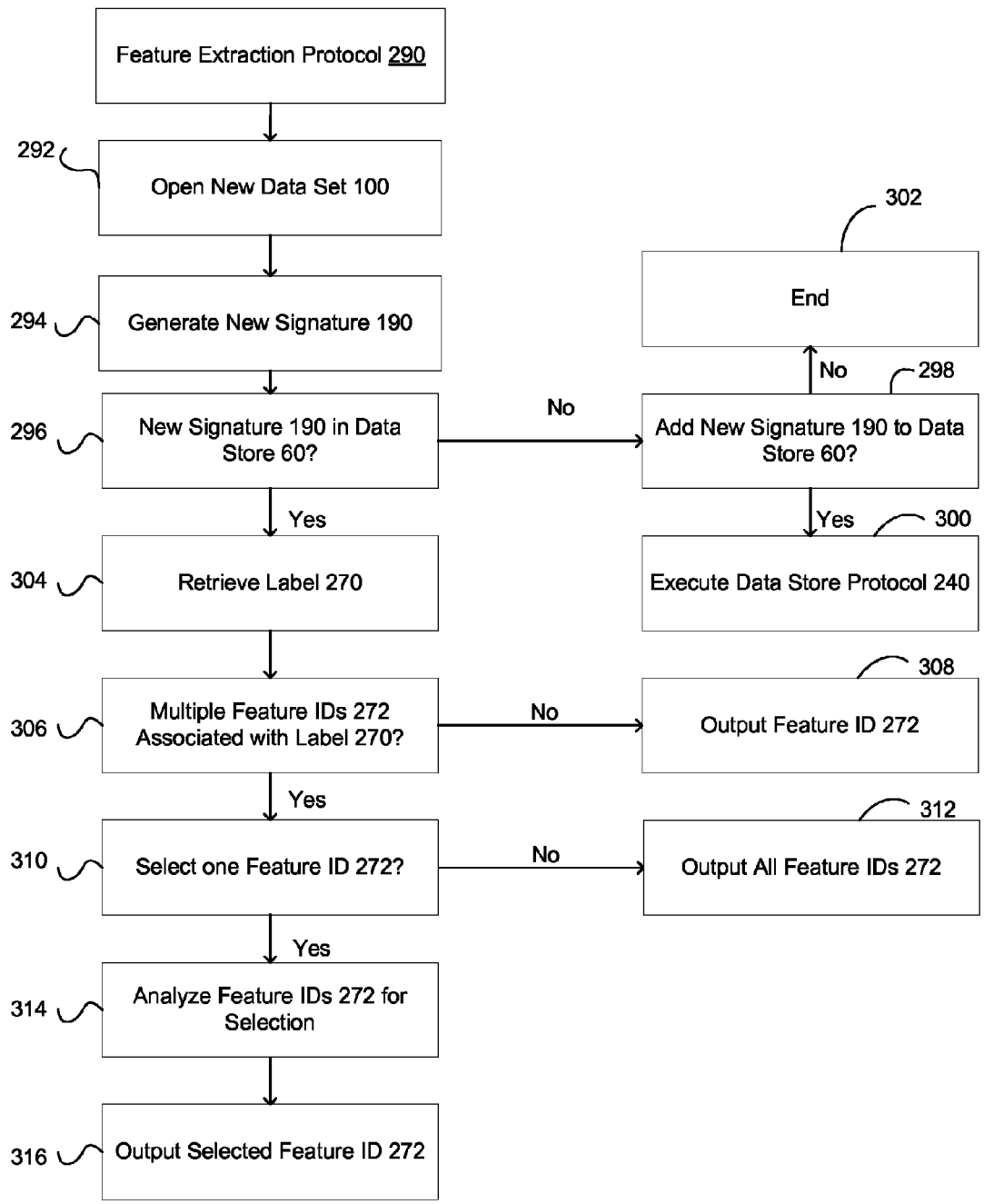
FIG. 18 is a flowchart of one embodiment of a feature extraction protocol that may be used by the data processing system of FIG. 1.

One embodiment of a feature extraction or recognition protocol is presented in FIG. 18, is identified by reference numeral 290, and may be integrated in any appropriate manner by the data processing system 10 of FIG. 1. A data set 100 may be opened for analysis by the data processing system 10 (step 292). At least one and more typically a plurality of signatures 190 may be generated from the new data set 100 (step 294; signature generation profile 160 of FIG. 5). Each signature 190 generated from the new data set 100 by the feature extraction protocol 290 may be assessed by the feature extraction protocol 290. However, the protocol 290 will hereafter be addressed in relation to a particular new signature (e.g., steps 296-316 may be repeated for each newly generated signature 190).

A signature 190 generated from the new data set 100 may be checked against the data store 60 by the feature extraction protocol 290 of FIG. 18 (step 296). If this new signature 190 is not in the data store 60, the feature extraction protocol 290 may be configured to allow this new signature 190 to be added to the data store 60 through execution of the data store protocol 240 of FIG. 12 (via steps 298 and 300 of the feature extraction protocol 290). A new signature 190 that is not in the data store 60 could also be disregarded (step 302) for purposes of the feature extraction protocol 290 (e.g., such a signature may be associated with an "undefined feature" or the like).

If step 296 of the feature extraction protocol 290 results in a determination that a particular new signature 190 from the new data set 100 is in fact within the data store 60, all relevant labels 270 may be retrieved from the processing store 60 (step 304). In one embodiment, step 296 of the feature extraction protocol 290 utilizes the processing store 80 side of the data store 60—a new signature 190 may be compared with the processing store binary tree 82. Any new signature 190 should be within the interval of a single node 84 of the processing store binary tree 82 (and thereby associated with a single label 270), although this single label 270 may be associated with multiple signatures 190 that have been previously stored in the processing store 80 side of the data store 60. Therefore, if the signature 190 is within the processing store 80 side of the data store 60, the feature extraction protocol 290 should retrieve one label 270 from the processing store 80. Although the feature extraction protocol 290 may use the processing store 80 for step 296, it could also use the training store 70 (although it may be computationally slower than utilizing the processing store 80, but a comparison of a new signature 190 with the training store 70 should offer a higher degree of specificity).

Step 306 of the feature extraction protocol 290 is directed to determining if multiple feature IDs 272 are associated with a label 270 from step 304. If not, a single feature ID 272 may be output in any appropriate manner (step 308; via the data output device 14 from the data processing system 10 of FIG. 1). If step 306 results in a determination that multiple feature IDs 272 are associated with a label 270 that includes the new signature 190 being assessed, the feature extraction protocol 290 proceeds to step 310. The feature extraction protocol 290 allows all feature IDs 272 to be output (step 312—via the data output device 14 from the data processing system 10 of FIG. 1). The feature extraction protocol 290 also allows a single feature ID 272 to be selected for the case where there is a multiplicity of feature IDs 272. Step 314 is directed to making an assessment of the various feature IDs 272. This assessment may be undertaken in any appropriate manner. For instance, this assessment may utilize a contextual-based analysis. A "levels of confidence" analysis could also be utilized (e.g., the feature ID 272 having the highest level of confidence, from the multiple feature IDS 272 associated with step 306, could be selected pursuant to step 314). In any case, one of the feature IDs 272 is selected from this assessment and is output in relation to step 316 (e.g., via the data output device 14 from the data processing system 10 of FIG. 1).

Figure 19:
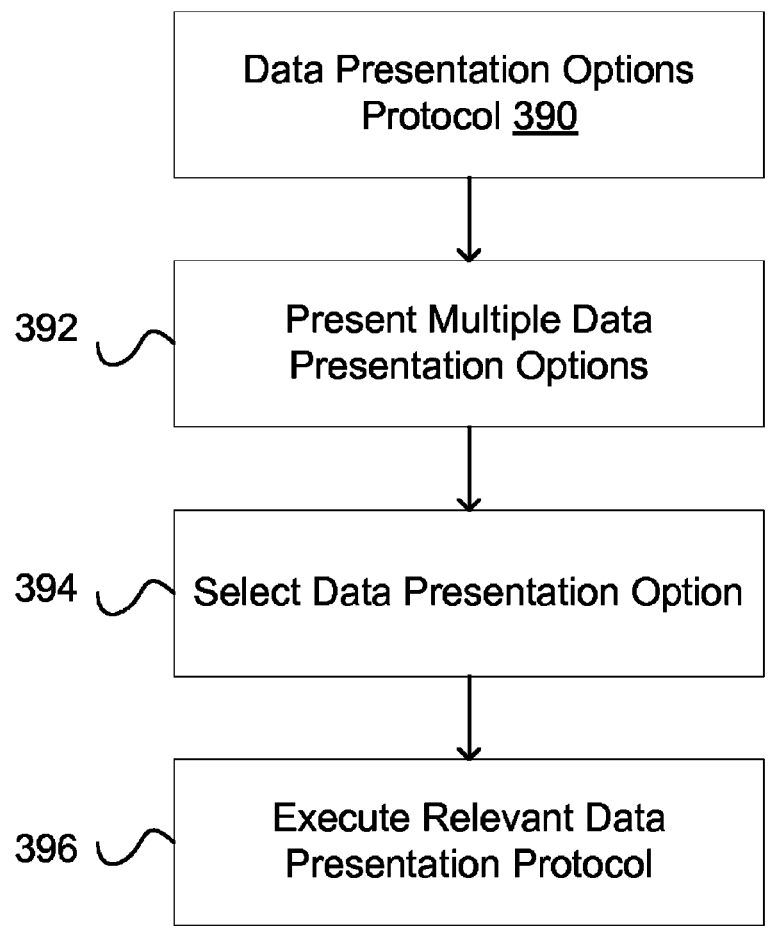
FIG. 19 is a flowchart of one embodiment of a data presentation options protocol that may be used by the data processing system of FIG. 1.

Signatures 190 that are developed by the data processing system 10 of FIG. 1 may also be utilized to provide or output various types of data presentations (e.g., via its data output device 14; visual presentations). One embodiment of a data presentation options protocol is illustrated in FIG. 19, is identified by reference numeral 390, and may be integrated in any appropriate manner by the data processing system 10 of FIG. 1. Multiple presentation options may be presented by the data processing system 10 of FIG. 1 in any appropriate manner (step 392). For instance, a screen on the graphical user interface 12 of the data processing system 10 could identify present a "tab" for each data presentation option that is available through the data processing system 10. Such a screen on the graphical user interface 10 could also provide a listing of the available data presentation options through a drop-down menu, window, list, or the like. In any case, a visualization option to be executed by the data processing system 10 may be selected (step 394), and the relevant data presentation protocol thereafter may be executed (step 396).

Figure 20:
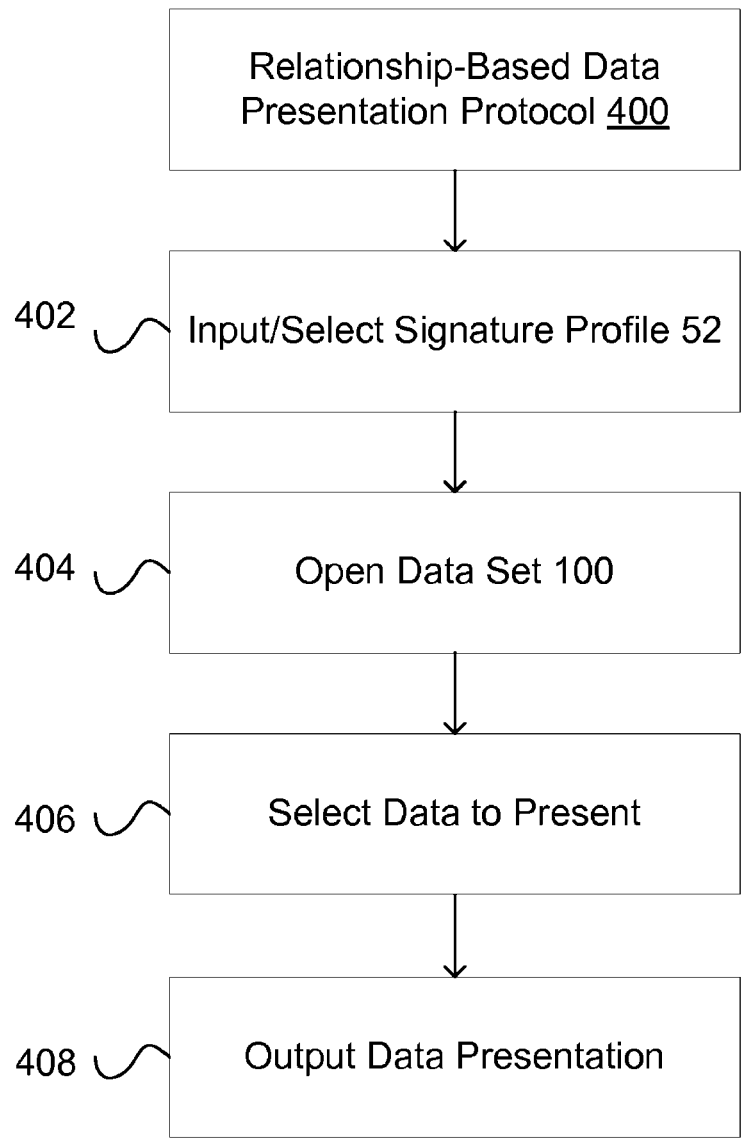
FIG. 20 is a flowchart of one embodiment of a relationship-based data presentation protocol that may be used by the data processing system of FIG. 1.

A relationship-based data presentation protocol 400 is illustrated in FIG. 20, may be one of the multiple presentation options for purposes of step 392 of the data presentation options protocol 390 of FIG. 19, and may be integrated in any appropriate manner by the data processing system 10 of FIG. 1. The relationship-based data presentation protocol 400 includes inputting or selecting a signature profile 52 (step 402; signature profile protocol 140 of FIG. 4), as well as opening a new data set 100 (step 404). Steps 402 and 404 may be executed in any order. Step 406 of the relationship-based data presentation protocol 400 is directed to selecting the data to present from the opened data set 100 (step 406). A data presentation is then output pursuant to step 408 (via the data output device 14 from the data processing system 10 of FIG. 1). For instance, signatures 190 may be generated from each data element 101 of the data set 100. Each such signature 190 may be compared to the data store 60 for purposes of retrieving a feature ID 272 for the signature 190. This feature ID 272 may be used to present an output corresponding with the feature associated with the feature ID 272.

Figure 21:
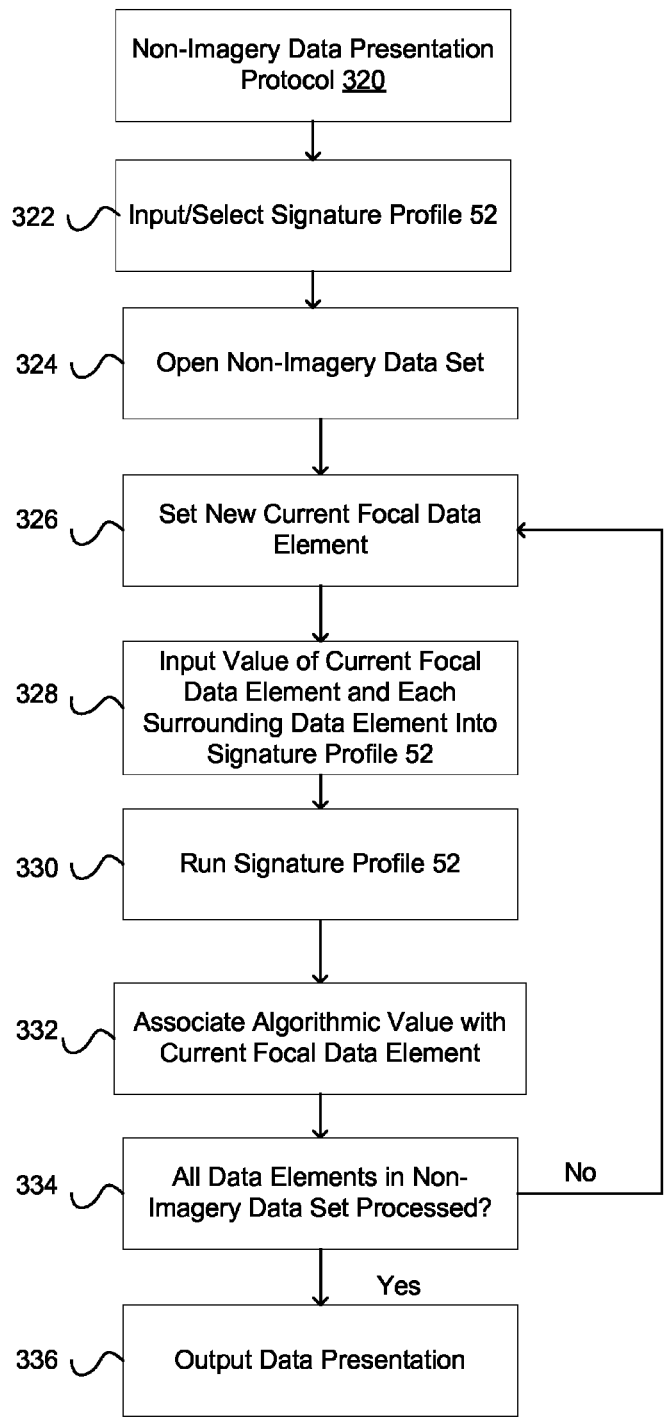
FIG. 21 is a flowchart of one embodiment of a non-imagery data presentation protocol that may be used by the data processing system of FIG. 1.

Another presentation option for step 392 of the data presentation options protocol 390 of FIG. 19 is shown in FIG. 21 in the form of a non-imagery data presentation protocol 320. This non-imagery data may be one, two, three, or n-dimensional. In any case, this non-imagery data visualization protocol 320 may be integrated in any appropriate manner by the data processing system 10 of FIG. 1. The non-imagery data presentation protocol 320 includes inputting or selecting a signature profile 52 (step 322; signature profile protocol 140 of FIG. 4), as well as opening a non-imagery data set (step 324; e.g., of the type addressed above in relation to FIGS. 7-7B). Steps 322 and 324 may be executed in any order.

A signature 190 may be generated for each data element of the non-imagery data set (e.g., data elements 212 of the 1D data set 210 of FIGS. 7-7B) for purposes of the non-imagery data presentation protocol 320, although signatures 190 could be processed for less than the entirety of the data elements included in the non-imagery data set (e.g., data set 210). In any case, a new focal data element (e.g., focal data element 214 from the 1D data set 210) for the non-imagery data set may be set through step 326 of the non-imagery data presentation protocol 320. The value of the current focal data element (and each surrounding or related data element; e.g., each related data element 218 for the surrounding data element pattern 216 discussed in relation to FIGS. 7-7B) may be input into the signature profile 52 through step 328 of the protocol 320. Each algorithm 42 of the signature profile 52 may be run or executed pursuant to step 330. The algorithmic value that is generated by the execution of the signature profile 52 is associated with the current focal data element pursuant to step 332. A determination is made at step 334 as to if all data elements in the non-imagery data set have been processed (assuming that signatures 190 are to be generated for each data element of the non-imagery data set). If not, the non-imagery data presentation protocol 320 returns to step 326 for repetition in accordance with the foregoing. Once all of the data elements of the non-imagery data set have been processed by the non-imagery data presentation protocol 320, a data presentation may be output pursuant to step 336 (e.g., via the data output device 14 for the data processing system 10 of FIG. 1).

Consider the case where each data element 212 of the 1D data set 210 of FIGS. 7-7B has an associated value. The non-imagery data presentation protocol 320 of FIG. 21 may be characterized as generating a signature 190 for each data element 212, and then substituting the associated signature value 192 for its original value. The collection of signature values 192 may be characterized as the "data presentation" that may be output pursuant to step 336 of the non-imagery data presentation protocol 320.

Figure 22:
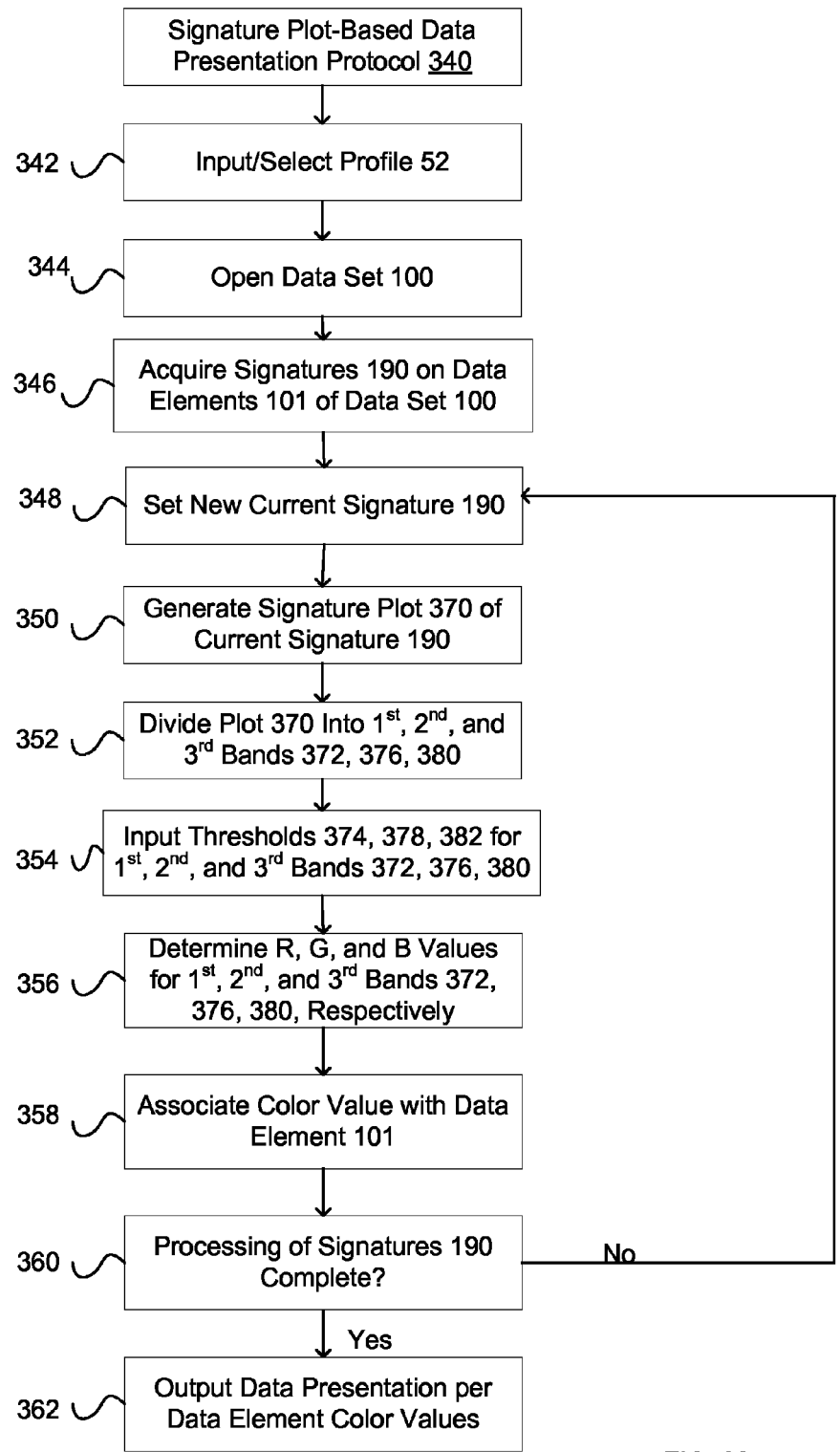
FIG. 22 is a flowchart of one embodiment of a signature plot-based data presentation protocol that may be used by the data processing system of FIG. 1.

Another presentation option for step 392 of the data presentation options protocol 390 of FIG. 19 is shown in FIG. 22 in the form of a signature plot-based data presentation protocol 340. This signature plot-based data presentation protocol 340 may be integrated in any appropriate manner by the data processing system 10 of FIG. 1. The signature plot-based data presentation protocol 340 includes inputting or selecting a signature profile 52 (step 342; signature profile protocol 140 of FIG. 4), as well as opening at least one new data set 100 (step 344). Steps 342 and 344 may be executed in any order.

Signatures 190 on at least some of the data elements 101 of the data set 100 are acquired pursuant to step 346 of the signature plot-based data presentation protocol 340 (e.g., from a signature processing engine (e.g., signature processing engine 30), from a data store accessible by the data processing system 10 (e.g., data store 60), from a signature store, or the like). A signature 190 may be acquired for each data element 101 of the data set 100 for purposes of the signature plot-based data presentation protocol 340, although signatures 190 could be processed for less than the entirety of the data elements 101 defining the data set 100 to be processed in accordance with the signature plot-based data presentation protocol 340. Again, a signature 190 pertains to a specific data element 101 (a focal data element 104), but this particular data element 101 is defined in relation to at least one other data element 101 (one or more surrounding or related data elements 108).

Each of signatures 190 acquired in accordance with step 346 may be processed for presentation in accordance with the signature plot-based data presentation protocol 340. In this regard, a new current signature 190 is set pursuant to step 348. A signature plot 370 of the current signature 190 is generated pursuant to step 350 (e.g., FIG. 23 discussed below). This signature plot 370 is divided into a first band 372, a second band 376, and a third band 380 (step 352). The three bands 372, 376, and 380 are associated with the three bands of the RGB color model. The first band 372 may be associated with the color for red light [(255, 0, 0) for an 8-bit channel, or 8 bits/byte], the second band 376 may be associated with the color for green light [(0, 255, 0) for an 8-bit channel], and the third band 380 may be associated with the color for blue light [(0, 0, 255) for an 8-bit channel].

A threshold 374, 378, and 382 is defined for the three bands 372, 376, and 380, respectively (step 354). The R, G, and B values are thereafter determined for the first, second, and third bands 372, 376, and 380, respectively. This may be done in any appropriate manner. For instance, each of the bands 372, 376, and 380 may be divided up into 8 bits. The average of the R values for the 8 bits in the first band 372 may be used as the R value for the first band 372. The average of the G values for the 8 bits in the second band 376 may be used as the G value for the second band 376. Finally, the average of the B values for the 8 bits in the third band 380 may be used as the B value for the third band 380.

The three color values provided by step 356 of the signature plot-based data presentation protocol 340 are then associated with the current data element 101 in accordance with step 358 (that which is the subject of the current signature 190 from step 348). These three color values may of course be combined to define a single color for the associated current data element 101. If all signatures 190 have not yet been processed (step 360), the signature plot-based data presentation protocol 340 returns to step 348 for repetition in accordance with the foregoing. Otherwise, a data presentation is output pursuant to step 362 using the color values for the associated data elements 101 (e.g., via the data output device 14 from the data processing system 10 of FIG. 1).

Consider the case where each data element 101 of the data set 100 has an associated original value. The signature plot-based data presentation protocol 340 of FIG. 22 may be characterized as generating a signature 190 for each data element 101, deriving a color value from its signature 190, and then substituting the associated color value for its original value. The collection of color values (for the various data elements 101) may be characterized as a "signature-derived color value data set" that may be output pursuant to step 362 of the signature plot-based data presentation protocol 340.

Figure 23:
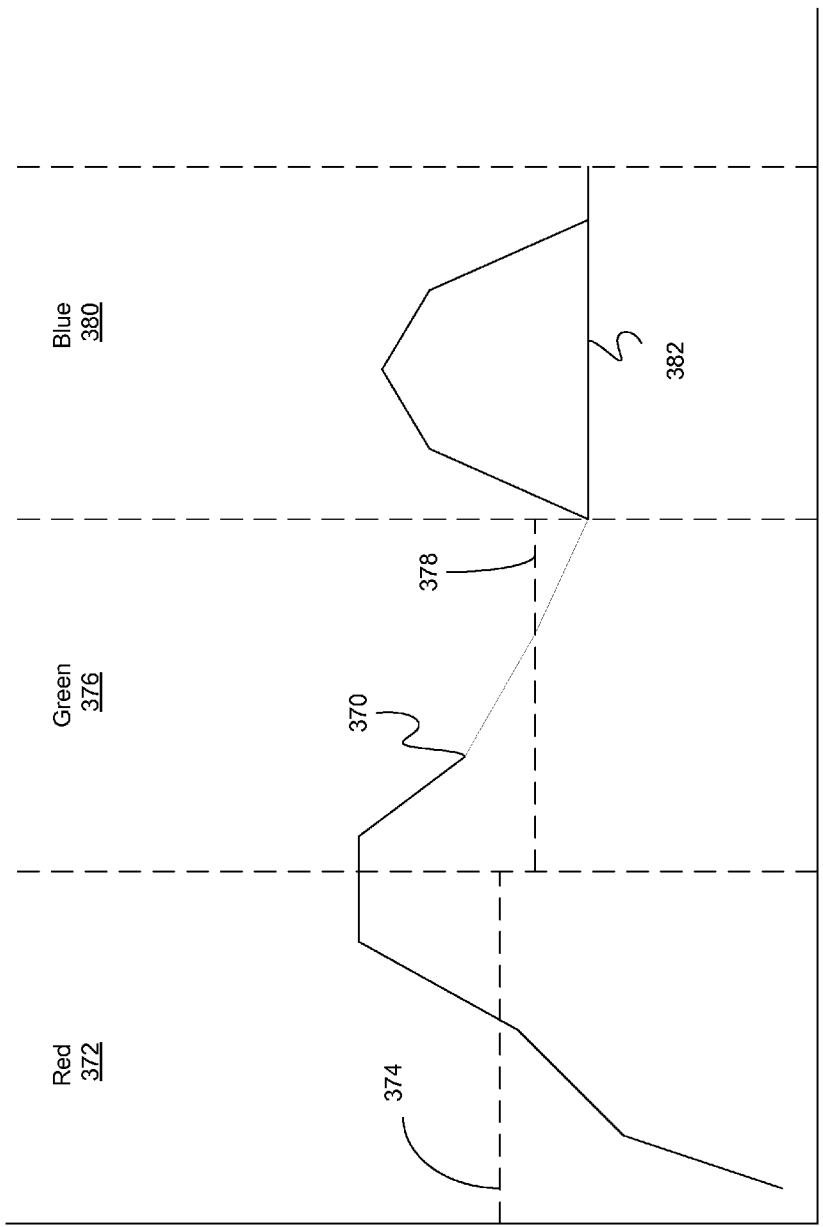
FIG. 23 is a schematic representation of various steps of the signature plot-based data presentation protocol of FIG. 22.

FIG. 23 illustrates one embodiment of a plot 370 for a signature 190 pursuant to the signature plot-based data presentation protocol 340 of FIG. 22. The plot 370 is divided into a red band 372, a green band 376, and a blue band 380. A threshold 374 is defined for each of the bands 372, 376, and 380. Although this threshold 374 could be the same throughout the plot 370 (i.e., for each of the bands 372, 376, 380), the threshold 374 may be tailored for each of the bands 372, 376, and 380 (e.g., there may be a different threshold 374 in each band 372, 376, 380; the same threshold 374 could be used in two of the bands 372, 376, 380, and a different threshold 374 could be used in the third of the bands 372, 376, 380).

The R, G, and B values may be determined for the bands 372, 376, and 380, respectively, in any appropriate manner as noted in relation to the signature plot-based data presentation protocol 340. For instance, each band 372, 376, and 380 may be divided up into 8 bits. The R value for the red band 372 may be the average of the 8 R values. Portions of the plot 370 in each of the bands 372, 376, and 380 that are below the associated threshold 374 may be assigned a "0" value.

Figure 24:
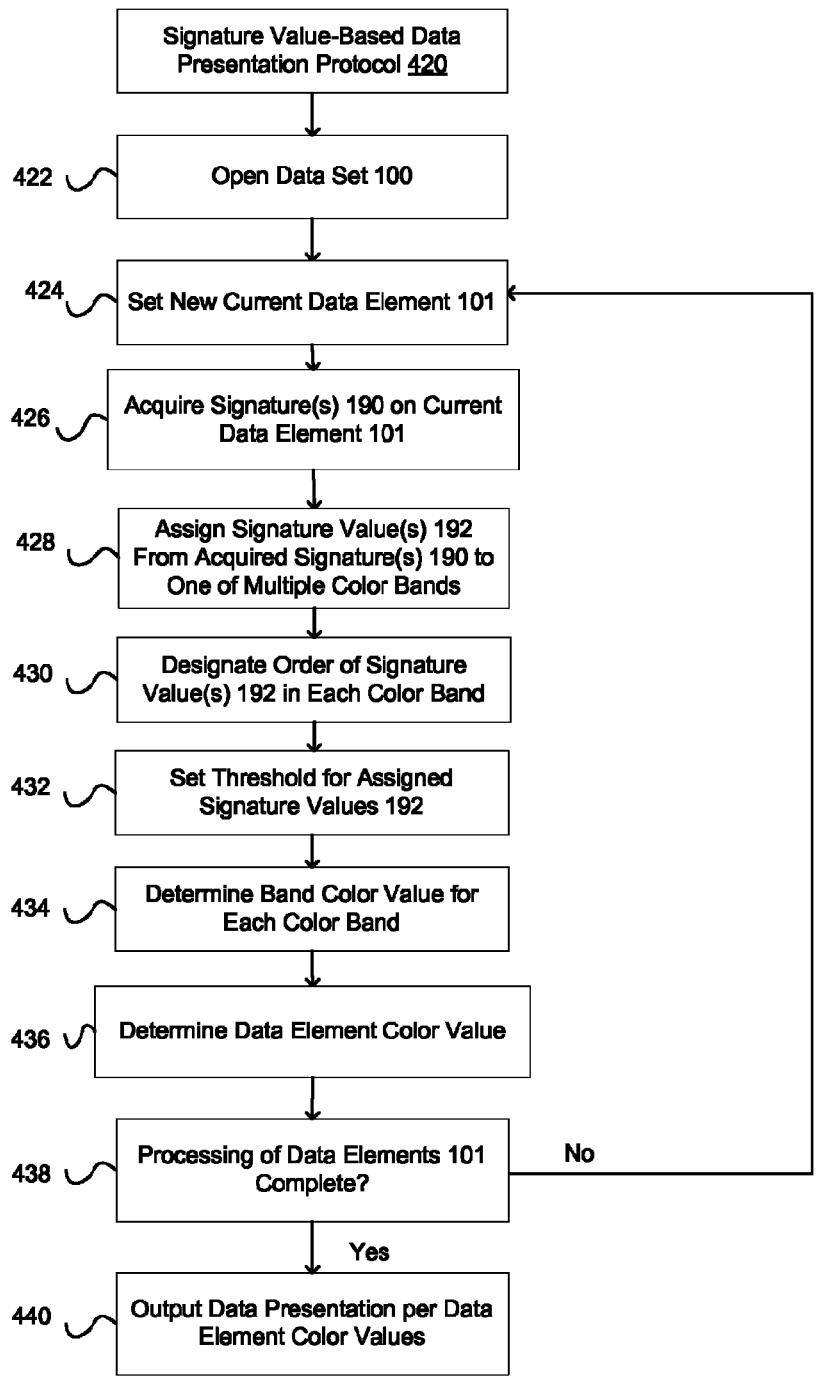
FIG. 24 is a flowchart of one embodiment of a signature value-based data presentation protocol that may be used by the data processing system of FIG. 1.

Yet another presentation option for step 392 of the data presentation options protocol 390 of FIG. 19 is shown in FIG. 24 in the form of a signature value-based data presentation protocol 420. This signature value-based data presentation protocol 420 may be integrated in any appropriate manner by the data processing system 10 of FIG. 1.

The signature value-based data presentation protocol 420 includes opening at least one new data set 100 (step 422) and setting a new current data element 101 (step 424)—that is, the protocol 420 accommodates processing one more data elements 101 from one or more data sets 100, including all data elements 101 from one or more data sets 100. At least one signature 190 is acquired on the current data element 101 (step 426). Each such signature 190 may be provided by a signature processing engine (e.g., signature processing engine 30), may be retrieved from a data store accessible by the data processing system 10 (e.g., data store 60), may be retrieved from a signature store, or the like. Any appropriate number of signatures 190 could be acquired on the same current data element 101 and used by the signature value-based data presentation protocol 420. For instance, one signature 190 on the current data element 101 may have been generated from one data type, and another signature 190 on the very same current data element 101 may have been generated from another data type. The acquisition of one or more signatures 190 pursuant to step 426 may be undertaken in any appropriate manner. For instance, one or more signatures 190 may be automatically acquired by the data processing system 10, one or more signatures 190 may be acquired in response to user input (e.g., through a user interface 12), or both.

Step 428 of the signature value-based data presentation protocol 420 is directed to assigning algorithms 42 (more specifically their corresponding signature value(s) 192) from one or more of the acquired signatures 190 (step 428) to one of a plurality of color bands. Any appropriate number of color bands may be utilized (e.g., 3 color bands for an RGB color model—a red band, a green band, and a blue band). This assignment of signature values 192 may be undertaken automatically by the data processing system 10, in response to user input (e.g., through the user interface 12), or both. Not all signature values 192 from a given signature 190 need be utilized by the signature-derived color data presentation protocol 420. Although it may be such that a given signature value 192 is only be used in one of the color bands, a given signature value 192 could be used in two or more of the color bands. More generally, at least one signature value 192 may be assigned to each color band. Each color band may have one or more signature values 192, including where each color band has a plurality of color bands.

In a 24-bit color system for the RGB color model, each of the red color band, the green color band, and the blue color band will have 8 bits. The impact of each bit on the color in a given color band is progressively reduced proceeding from the first bit to its eighth bit. Step 430 of the signature value-based data presentation protocol 420 is directed to designating the order of the signature values 192 in each color band. This order designation of signature values 192 may be undertaken automatically by the data processing system 10, in response to user input (e.g., through the user interface 12), or both. The band color value for each color band is determined pursuant to step 434, and the color value for the current data element is determined pursuant to step 436.

A threshold may be established in any appropriate manner for each signature value 192 that is assigned to any of the color bands. This threshold may be used to establish an on/off condition or status for the above-noted bits. For instance, each signature value 192 in a color band may define a bit for the color band, and its associated threshold may establish whether this bit is "on" or "off" (e.g., a "zero" or a "one"). The on/off status of the bits in each color band may be used to establish the color value for the band (step 434).

At least some, and including all, of the data elements 101 of the data set 100 may be processed in accordance with the foregoing (see step 438). Once the desired data elements 101 have been processed in accordance with the foregoing, a data presentation is output pursuant to step 440 and using the determined data element color values.

Yet another presentation option for step 392 of the data presentation options protocol 390 of FIG. 19 is shown in FIG.

Figure 25:
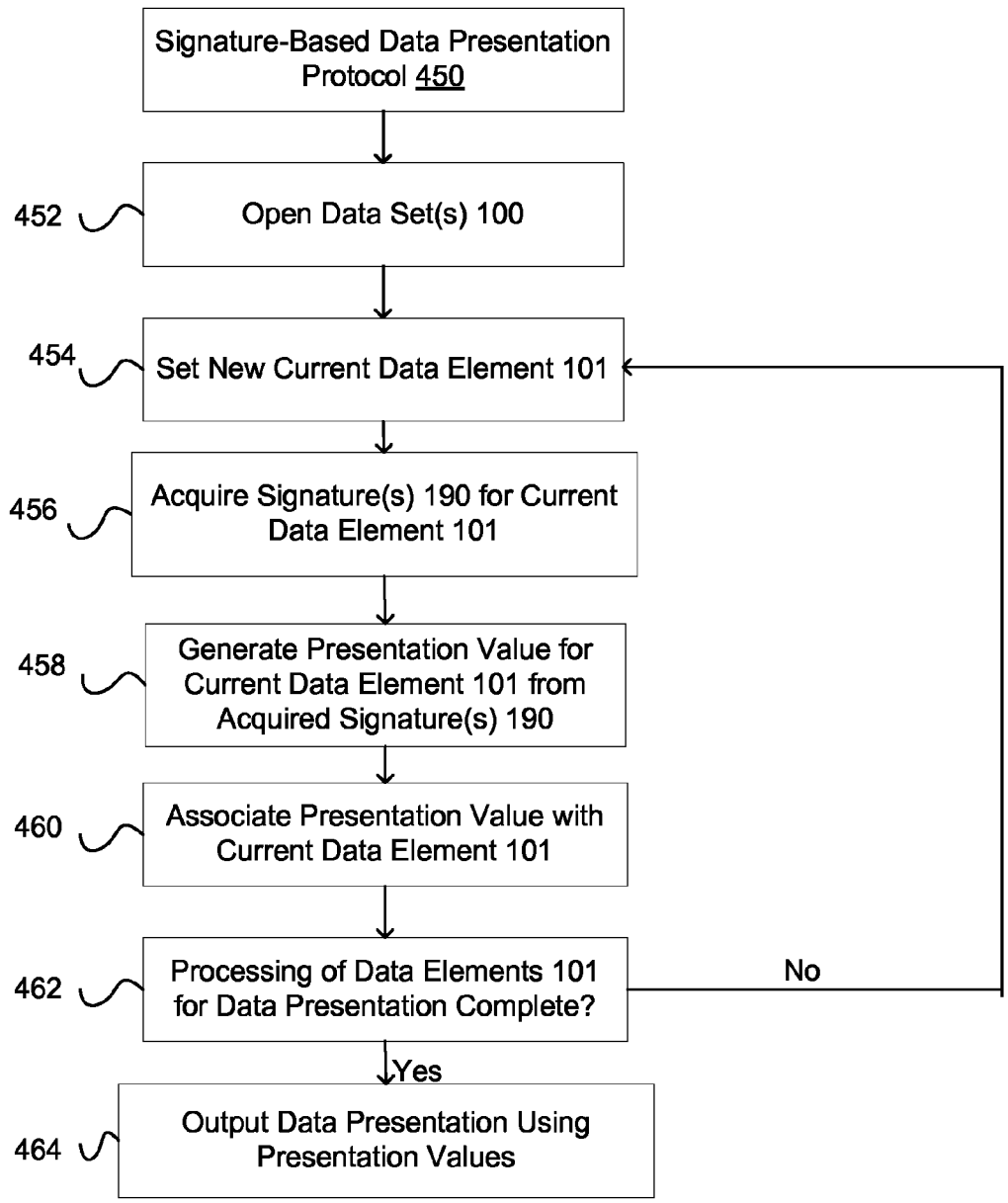
FIG. 25 is a flowchart of one embodiment of a signature-based data presentation protocol that may be used by the data processing system of FIG. 1.

25 in the form of a signature-based data presentation protocol 450. This signature-based data presentation protocol 450 may be integrated in any appropriate manner by the data processing system 10 of FIG. 1. The signature plot-based data presentation protocol 340 of FIG. 22, as well as the signature value-based data presentation protocol 420 of FIG. 24, each may be utilized by the signature-based data presentation protocol 450 of FIG. 25.

The signature-based data presentation protocol 450 includes opening at least one data set 100 (step 452) and setting a new current data element 101 (step 454)—that is, the protocol 450 accommodates processing one more data elements 101 from one or more data sets 100, including all data elements 101 from one or more data sets 100. At least one signature 190 is acquired on the current data element 101 (step 456). Each such signature 190 may be provided by a signature processing engine (e.g., signature processing engine 30), may be retrieved from a data store accessible by the data processing system 10 (e.g., data store 60), may be retrieved from a signature store, or the like. Any appropriate number of signatures 190 could be acquired on the same current data element 101 for use by the signature-based data presentation protocol 450. For instance, one signature 190 on the current data element 101 may have been generated from one data type, and another signature 190 on the very same current data element 101 may have been generated from another data type. The acquisition of one or more signatures 190 pursuant to step 456 may be undertaken in any appropriate manner. For instance, one or more signatures 190 may be automatically acquired by the data processing system 10, one or more signatures 190 may be acquired in response to user input (e.g., through a user interface 12), or both.

Step 458 of the signature-based data presentation protocol 450 is directed to generating a presentation value for the current data element 101 utilizing the acquired signature(s) 190 from step 456. Step 458 of the signature-based data presentation protocol 450 may utilize the signature plot-based data presentation protocol 340 of FIG. 22, as well the signature value-based data presentation protocol 420 of FIG. 24. Any appropriate way of generating a presentation value for the current data element 101 utilizing at least one corresponding signature 190 may be utilized for purposes of step 458.

The presentation value from step 458 may be associated with the current data element 101 pursuant to step 460. For instance, this presentation value may be included in a new data set that is to be output. In any case, step 462 of the signature-based data presentation protocol 450 is directed to determining if the processing of data elements 101 has been completed. If not, the signature-based data presentation protocol 450 returns to step 454 for repetition in accordance with the foregoing. If presentation values have been acquired for a desired set of data elements 101, the signature-based data presentation protocol 450 proceeds from step 462 to step 464. Step 464 is directed to outputting a data presentation using the noted presentation values. Such a data presentation may be output in any appropriate manner (e.g., visually).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A data processing system, comprising:
a user interface;
a data extractor comprising a data extraction layer and an iterator operatively connected with said data extraction layer, wherein said data extraction layer is configured to organize data from a data set for use by said iterator, and wherein said data extraction layer is implemented using at least one of programmed software and at least one processor;
a signature processing engine operatively connected with said data extractor and comprising at least one processor, wherein data provided to said signature processing engine is controlled by an output from said signature processing engine to said data extractor, wherein said iterator is configured to map data provided by said data extractor for processing by said signature processing engine, and wherein said iterator is driven by one of said data extraction layer and said signature processing engine; and
a knowledge base data store operatively connected with said signature processing engine.

2. A data processing system, comprising:
a user interface;
a data extractor, wherein said data extractor comprises a data extraction layer and an iterator operatively connected with said data extraction layer, wherein said data extraction layer is configured to organize data from a data set for use by said iterator, and wherein said data extraction layer is implemented using at least one of programmed software and at least one processor;
a signature processing engine operatively connected with said data extractor and comprising at least one processor, wherein data provided to said signature processing engine is controlled by an output from said signature processing engine to said data extractor, wherein said iterator is configured to map data provided by said data extractor for processing by said signature processing engine, and wherein said iterator is driven by one of said data extraction layer and said signature processing engine;
an algorithm store operatively connected with said signature processing engine and comprising a plurality of algorithms;
a signature profile used by said signature processing engine and configurable by communication between said user interface and said algorithm store; and
a knowledge base data store operatively connected with said signature processing engine.

3. A data processing system, comprising:
a user interface;
a data extractor, wherein said data extractor comprises a data extraction layer and an iterator operatively connected with said data extraction layer, wherein said data extraction layer is configured to organize data from a data set for use by said iterator, and wherein said data extraction layer is implemented using at least one of programmed software and at least one processor;
a signature processing engine operatively connected with said data extractor and comprising at least one processor, wherein data provided to said signature processing engine is controlled by an output from said signature processing engine to said data extractor, wherein said iterator is configured to map data provided by said data extractor for processing by said signature processing engine, and wherein said iterator is driven by one of said data extraction layer and said signature processing engine;

a signature profile used by said signature processing engine and that is independent of a data type inputtable to said data extractor; and a knowledge base data store operatively connected with said signature processing engine.

4. The data processing system of claim 3, wherein said data set comprises raw data.

5. The data processing system of claim 3, wherein said data set comprises processed data.

6. The data processing system of claim 5, wherein said processed data comprises at least one processed signature.

7. The data processing system of claim 3, wherein said data extractor provides an interface between said data set and said signature processing engine.

8. The data processing system of claim 3, wherein said data set comprises n-dimensional data.

9. The data processing system of claim 3, wherein said data set comprises three-dimensional data.

10. The data processing system of claim 3, wherein said data set comprises two-dimensional data.

11. The data processing system of claim 3, wherein said data set comprises one-dimensional data.

12. The data processing system of claim 3, wherein said data set comprises zero-dimensional data.

13. The data processing system of claim 3, wherein said data set comprises a first data set and a second data set.

14. The data processing system of claim 13, wherein said first and second data sets are of a common data type.

15. The data processing system of claim 13, wherein said first and second data sets are of a different data type.

16. The data processing system of claim 3, wherein said data set comprises a plurality of processed signatures communicated to said data extractor by at least one other signature processing engine.

17. The data processing system of claim 16, wherein each of said plurality of processed signatures comprises an n-dimensional signature.

18. The data processing system of claim 16, wherein each of said plurality of processed signatures is generated from raw data of a common data type.

19. The data processing system of claim 16, wherein a first subset of said plurality of processed signatures is from a first raw data set and a second subset of said plurality of processed signatures is from a second raw data set.

20. The data processing system of claim 3, wherein said data extractor is configured to extract data from said data set.

21. The data processing system of claim 20, wherein said data extractor is configured to extract both actual data and metadata from said data set.

22. The data processing system of any of claim 3, wherein said data extraction layer is configured to transmit data to said iterator.

23. The data processing system of claim 3, wherein said data extraction layer is configured to create said iterator.

24. The data processing system of claim 23, wherein said iterator is created from input provided by said signature processing engine to said data extraction layer.

25. The data processing system of claim 3, further comprising:

a signature profile communication link between said signature processing engine and said data extractor.

26. The data processing system of claim 3, further comprising:

a signature profile communication transmittable from said signature processing engine to said data extractor.

27. The data processing system of claim 26, wherein said signature profile communication embodies information on each algorithm to be used by said signature processing engine for a signature generation operation.

28. The data processing system of claim 3, wherein said data extractor comprises a signature processing engine communication port, wherein said signature processing engine comprises a data extractor communication port, and wherein signature processing engine requirements are transmitted from said data extractor communication port of said signature processing engine to said signature processing engine communication port of said data extractor.

29. The data processing system of claim 3, wherein said signature processing engine is configured to output data configuration information to said data extractor.

30. The data processing system of claim 3, wherein said iterator is configured to process an entirety of said data set provided by said data extraction layer.

31. The data processing system of claim 3, wherein said iterator passes data to said signature processing engine in a predetermined format.

32. The data processing system of claim 31, wherein said predetermined format is established by said signature processing engine.

33. The data processing system of claim 32, wherein said signature processing engine communicates said predetermined format to said data extraction layer, which in turn causes said iterator to be configured to provide said data to said signature processing engine in said predetermined format.

34. The data processing system of claim 3, wherein said iterator is configured to pass both actual data and metadata to said signature processing engine.

35. The data processing system of claim 3, wherein said signature processing engine defines a plurality of processed signatures from said data set provided to said data extractor.

36. The data processing system of claim 35, wherein each of said plurality of processed signatures is compared with said knowledge base data store.

37. The data processing system of claim 35, wherein each of said plurality of processed signatures is defined by said signature profile.

38. The data processing system of claim 37, wherein said signature profile comprises a predetermined algorithm set.

39. The data processing system of claim 38, wherein said predetermined algorithm set comprises at least one algorithm, wherein each said algorithm in said predetermined algorithm set is arranged in a predetermined order to define said signature profile.

40. The data processing system of claim 37, wherein said knowledge base data store comprises a plurality of data store signatures that are also each defined by said signature profile.

41. The data processing system of claim 3, wherein said signature processing engine is configured to process data on a focal data element-by-focal data element basis and in relation to a predetermined pattern of one or more other data elements.

42. The data processing system of claim 41, wherein said signature processing engine is configured to define a signature on each of a plurality of focal data elements, wherein each said signature defines its corresponding said focal data element in relation to one or more other data elements.

43. The data processing system of any of claim 3, further comprising:

an algorithm store operatively connected with said signature processing engine.

44. The data processing system of claim 43, wherein said algorithm store comprises a plurality of algorithms.

45. The data processing system of claim 43, wherein said signature profile used by said signature processing engine is configurable by communication between said user interface and said algorithm store.

46. The data processing system of claim 43, wherein at least one algorithm from said algorithm store defines said signature profile used by said signature processing engine.

47. The data processing system of claim 46, wherein said knowledge base data store comprises a plurality of data store signatures that are also defined by said signature profile, wherein said signature processing engine defines a plurality of processed signatures from said data set provided to said data extractor and using said signature profile.

48. The data processing system of claim 47, further comprising:
a comparator, wherein each of said plurality of processed signatures is compared with at least one said data store signature.

49. The data processing system of claim 47, further comprising:
a comparator, wherein said comparator assesses each of said plurality of processed signatures for a match with at least one said data store signature.

50. The data processing system of claim 43, wherein a plurality of algorithms from said algorithm store, and arranged in a predetermined order, defines said signature profile used by said signature processing engine.

51. The data processing system of claim 3, wherein said knowledge base data store comprises a plurality of data store signatures.

52. The data processing system of claim 51, wherein said plurality of data store signatures is defined by said signature profile.

53. The data processing system of claim 52, wherein said signature profile is defined by at least one algorithm.

54. The data processing system of claim 52, wherein said signature profile is defined by a plurality of said algorithms that are arranged in a predetermined order.

55. The data processing system of claim 51, wherein each of said plurality of data store signatures is defined by a single algorithm.

56. The data processing system of claim 55, wherein said single algorithm provides at least one value for each of said plurality of data store signatures.

57. The data processing system of claim 51, wherein each of said plurality of data store signatures is defined by a plurality of algorithms.

58. The data processing system of claim 57, wherein said plurality of algorithms is arranged in a predetermined order.

59. The data processing system of claim 57, wherein said plurality of algorithms provide a plurality of values to define each of said plurality of data store signatures.

60. The data processing system of claim 51, wherein each of said plurality of data store signatures comprises at least one algorithm value.

61. The data processing system of claim 51, further comprising a label associated with each of said plurality of data store signatures.

62. The data processing system of claim 51, further comprising a feature associated with each of said plurality of data store signatures.

63. The data processing system of claim 51, further comprising metadata associated with each of said plurality of data store signatures.

64. The data processing system of claim 63, wherein said metadata is initially associated with raw data from which said plurality of data store signature signatures is generated.

65. The data processing system of claim 51, wherein each of said plurality of data store signatures is one-dimensional.

66. The data processing system of claim 51, wherein each of said plurality of data store signatures is representative of a single focal data element and its relationship with at least one other related data element.

67. The data processing system of claim 66, wherein said single focal data element comprises a data point.

68. The data processing system of claim 66, wherein said single focal data element comprises multiple data points.

69. The data processing system of claim 66, wherein each of said plurality of data store signatures is representative of said single focal data element and its relationship with a plurality of related data elements.

70. The data processing system of claim 51, wherein each of said plurality of data store signatures comprises an associated tunnel.

71. The data processing system of claim 70, wherein at least one said tunnel is user-defined.

72. The data processing system of claim 70, wherein at least one said tunnel is defined by at least one algorithm.

73. The data processing system of claim 70, wherein each said tunnel provides an associated buffer for its associated said data store signature.

74. The data processing system of claim 51, wherein each of said plurality of data store signatures further comprises metadata.

75. The data processing system of claim 51, wherein each of said plurality of data store signatures is derived from raw data.

76. The data processing system of claim 51, wherein each of said plurality of data store signatures is derived other than from raw data.

77. The data processing system of claim 51, wherein each of said plurality of data store signatures is a higher order signature.

78. The data processing system of claim 51, wherein each of said plurality of data store signatures is defined by a tunnel that encompasses a plurality of said data store signatures.

79. The data processing system of claim 51, wherein each of said plurality of data store signatures is defined by running a signature over a signature.

80. The data processing system of claim 3, wherein said knowledge base data store comprises a training store and a separate processing store.

81. The data processing system of claim 80, wherein populating said training store in turn populates said processing store.

82. The data processing system of claim 80, wherein an order of said training store is signature-based, and wherein an order of said processing store is signature tunnel-based.

83. The data processing system of claim 80, wherein said training store comprises a binary tree of data store signatures, and wherein said processing store comprises a binary tree of disjointed sets.

84. The data processing system of claim 3, wherein said knowledge base data store comprises at least one binary tree.

85. The data processing system of claim 3, further comprising:
a plurality of functions.

86. The data processing system of claim 85, wherein said plurality of functions comprises at least two of feature extraction, painting, pattern recognition, data re-visualization, and data visualization.

87. The data processing system of claim 85, wherein each of said plurality of functions is accessible through said user interface.

88. The data processing system of claim 3, further comprising:
a display.

89. The data processing system of claim 88, further comprising:
multiple data presentation options presented on said display and each being selectable through said user interface.

90. The data processing system of claim 89, wherein said multiple data presentation options comprise relationship-based data presentation utilizing a signature profile, non-imagery data presentation, and signature-based data presentation in which a color for a data element is provided from a signature that defines said data element in relation to at least one other data element.

91. The data processing system of claim 3, further comprising:
a data presentation options protocol.

92. The data processing system of claim 91, wherein said data presentation options protocol accommodates execution of multiple types of data presentations.

93. The data processing system of claim 92, further comprising:
to a relationship-based data presentation protocol executable through said data presentation options protocol, wherein said relationship-based data presentation protocol utilizes a signature profile.

94. The data processing system of claim 92, further comprising:
a non-imagery data presentation protocol executable through said data presentation options protocol.

95. The data processing system of claim 92, further comprising:
a signature-based data presentation protocol executable through said data presentation options protocol and configured to generate a color for a data element from a signature that defines said data element in relation to at least one other data element.

96. The data processing system of claim 91, further comprising:
a relationship-based data presentation protocol executable through said data presentation options protocol, wherein said relationship-based data presentation protocol is configured to utilize a signature profile to define a signature, wherein said signature is specific to a data element and defines said data element in relation to at least one other data element, and wherein said signature is used to represent said data element.

97. The data processing system of claim 91, further comprising:
a non-imagery data presentation protocol executable through said data presentation options protocol.

98. The data processing system of claim 91, further comprising:
a signature-based data presentation protocol executable through said data presentation options protocol and configured to generate a color for a data element from a signature that defines said data element in relation to at least one other data element.

99. The data processing system of claim 91, further comprising:
a display, wherein a data presentation is output to said display.

* * * * *